United States Patent
Pimentel et al.

(10) Patent No.: US 10,983,201 B2
(45) Date of Patent: Apr. 20, 2021

(54) USER INTERFACE FOR DISPLAYING POINT CLOUDS GENERATED BY A LIDAR DEVICE ON A UAV

(71) Applicant: DJI Technology, Inc., Burbank, CA (US)

(72) Inventors: Alain Pimentel, Palo Alto, CA (US); Kalyani Premji Nirmal, Palo Alto, CA (US); Comran Morshed, Palo Alto, CA (US); Arjun Sukumar Menon, San Jose, CA (US); Weifeng Liu, Fremont, CA (US)

(73) Assignee: DJI Technology, Inc., Burbank, CA (US)

(*) Notice: Subject to any disclaimer, the term of this patent is extended or adjusted under 35 U.S.C. 154(b) by 0 days.

(21) Appl. No.: 16/664,743

(22) Filed: Oct. 25, 2019

(65) Prior Publication Data

US 2020/0132822 A1 Apr. 30, 2020

Related U.S. Application Data

(60) Provisional application No. 62/752,273, filed on Oct. 29, 2018.

(51) Int. Cl.
*G06T 15/08* (2011.01)
*G01S 7/51* (2006.01)
(Continued)

(52) U.S. Cl.
CPC .............. *G01S 7/51* (2013.01); *G01S 17/42* (2013.01); *G01S 17/89* (2013.01);
(Continued)

(58) Field of Classification Search
None
See application file for complete search history.

(56) References Cited

U.S. PATENT DOCUMENTS

| 5,376,759 A | 12/1994 | Marx et al. |
| 2003/0043058 A1 | 3/2003 | Jamieson et al. |

(Continued)

FOREIGN PATENT DOCUMENTS

| CN | 103941748 A | 7/2014 |
| CN | 204489196 U | 7/2015 |

(Continued)

OTHER PUBLICATIONS

International Search Report and Written Opinion, PCT App. No. PCT/CN2019/113725, dated Feb. 6, 2020, 7 pages.
(Continued)

*Primary Examiner* — Said Broome
(74) *Attorney, Agent, or Firm* — Nicholson De Vos Webster & Elliott LLP

(57) ABSTRACT

Techniques are disclosed for real-time mapping in a movable object environment. A system for real-time mapping in a movable object environment, may include at least one movable object including a computing device, a scanning sensor electronically coupled to the computing device, and a positioning sensor electronically coupled to the computing device. The system may further include a client device in communication with the at least one movable object, the client device including a visualization application which is configured to receive point cloud data from the scanning sensor and position data from the positioning sensor, record the point cloud data and the position data to a storage location, generate a real-time visualization of the point cloud data and the position data as it is received, and display the real-time visualization using a user interface provided by the visualization application.

17 Claims, 17 Drawing Sheets

(51) Int. Cl.
*G06F 3/0484* (2013.01)
*G01S 17/42* (2006.01)
*G01S 17/89* (2020.01)

(52) U.S. Cl.
CPC .......... *G06F 3/04845* (2013.01); *G06T 15/08* (2013.01); *G06T 2200/24* (2013.01); *G06T 2210/56* (2013.01)

(56) References Cited

U.S. PATENT DOCUMENTS

| | | |
|---|---|---|
| 2008/0210025 A1 | 9/2008 | Goossen et al. |
| 2013/0258107 A1 | 10/2013 | Delibaltov et al. |
| 2016/0196687 A1* | 7/2016 | Alpert ..................... G06T 17/05 345/419 |
| 2016/0223653 A1 | 8/2016 | Hutson |
| 2016/0272308 A1 | 9/2016 | Gentry |
| 2017/0001721 A1 | 1/2017 | Saika et al. |
| 2018/0017682 A1* | 1/2018 | Tan ......................... G01S 17/86 |
| 2018/0232947 A1 | 8/2018 | Nehmadi et al. |

FOREIGN PATENT DOCUMENTS

| | | | |
|---|---|---|---|
| CN | 106225790 A | * 12/2016 | ............ G01S 19/47 |
| CN | 107640327 A | 1/2018 | |
| CN | 107941204 A | 4/2018 | |
| CN | 108227749 A | 6/2018 | |
| WO | 2018/152773 A1 | 8/2018 | |
| WO | 2018/156869 A1 | 8/2018 | |

OTHER PUBLICATIONS

Byers, S et al. "Nearest-Neighbor Clutter Removal for Estimating Features in Spatial Point Processes", Journal of the American Statistical Association, Jun. 1998, pp. 557-584.
International Search Report and Written Opinion, PCT App. No. PCT/US19/58218, dated Jan. 22, 2020, 11 pages.
International Search Report and Written Opinion, PCT App. No. PCT/US19/58219, dated Jan. 3, 2020, 9 pages.
Topcon, "IP-S3 HD1Compact, High-Density 3D Mobile Mapping System", White Paper, 2016, 4 pages.
White, Krista, "ArcMap—Changing or Transforming a Coordinate System for a Map Layer", available online at <https://uknow.drew.edu/confluence/pages/viewpage.action?pageId=36012740>, Spatial Data Center Tutorial Resources, Dec. 9, 2011, 1 page.

* cited by examiner

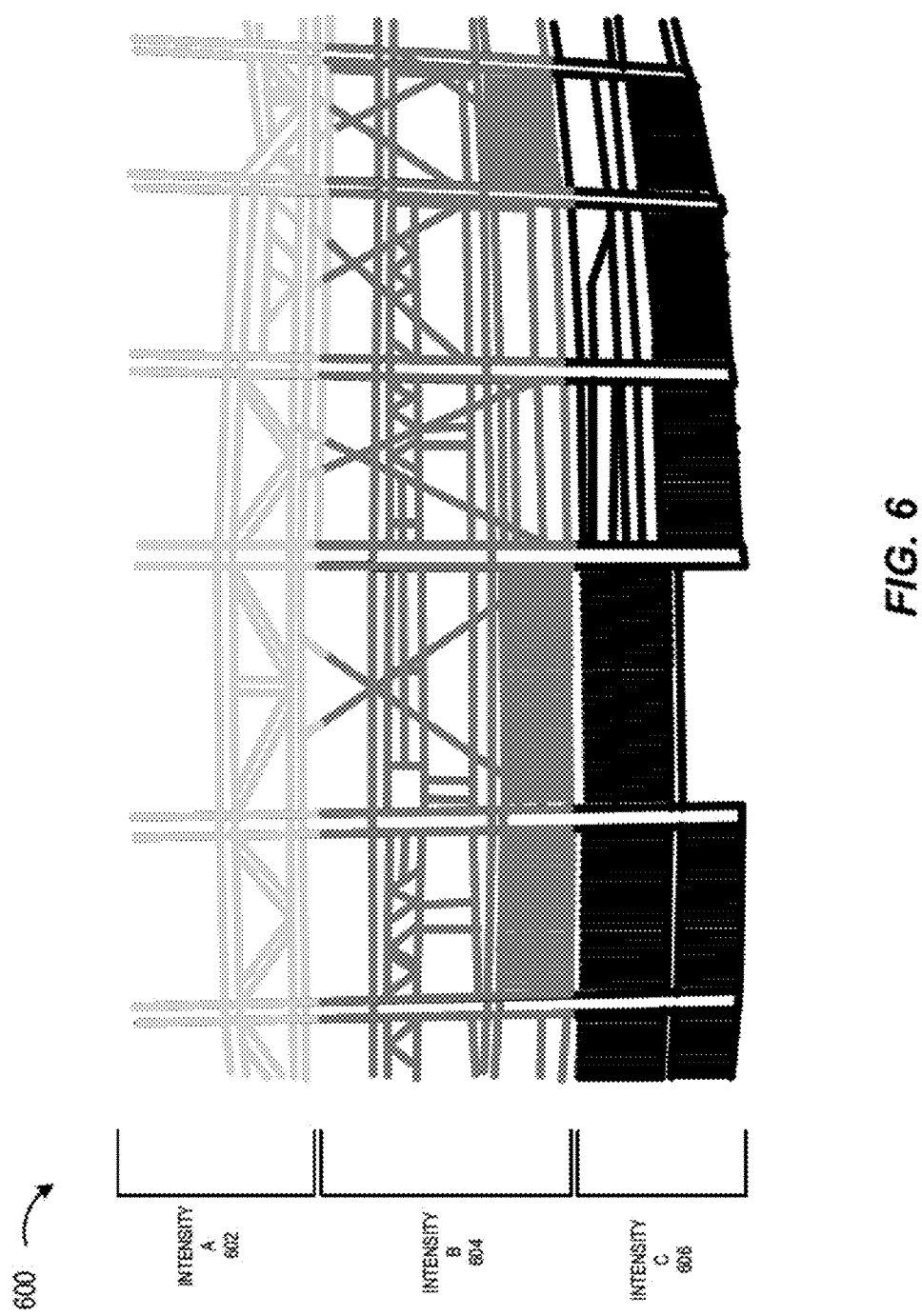

USER INTERFACE FOR DISPLAYING POINT CLOUDS GENERATED BY A LIDAR DEVICE ON A UAV

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of U.S. Provisional Application No. 62/752,273, filed Oct. 29, 2018, which is hereby incorporated by reference.

FIELD OF THE INVENTION

The disclosed embodiments relate generally to techniques for mapping and more particularly, but not exclusively, to a user interface for displaying point clouds generated by a LiDAR device on a UAV.

BACKGROUND

Movable objects such as unmanned aerial vehicles (UAVs) can be used for performing surveillance, reconnaissance, and exploration tasks for various applications. Movable objects may carry a payload, including various sensors, which enables the movable object to capture sensor data during movement of the movable objects. The captured sensor data may be rendered on a client device, such as a client device in communication with the movable object via a remote control, remote server, or other computing device.

SUMMARY

Techniques are disclosed for real-time mapping in a movable object environment. A system for real-time mapping in a movable object environment, may include at least one movable object, wherein the movable object includes a computing device, a scanning sensor coupled to the at least one movable object, and a positioning sensor coupled to the at least one movable object. The system may further include a client device in communication with the at least one movable object, the client device including at least one processor and a visualization application, the visualization application including instructions which, when executed by the processor, cause the visualization application to receive point cloud data from the scanning sensor and position data from the positioning sensor, record the point cloud data and the position data to a storage location, generate a real-time visualization of the point cloud data and the position data as it is received, and display the real-time visualization using a user interface provided by the visualization application.

BRIEF DESCRIPTION OF DRAWINGS

FIG. 6 illustrates an example of intensity values in mapping data, in accordance with various embodiments.

DETAILED DESCRIPTION

Figure 1:
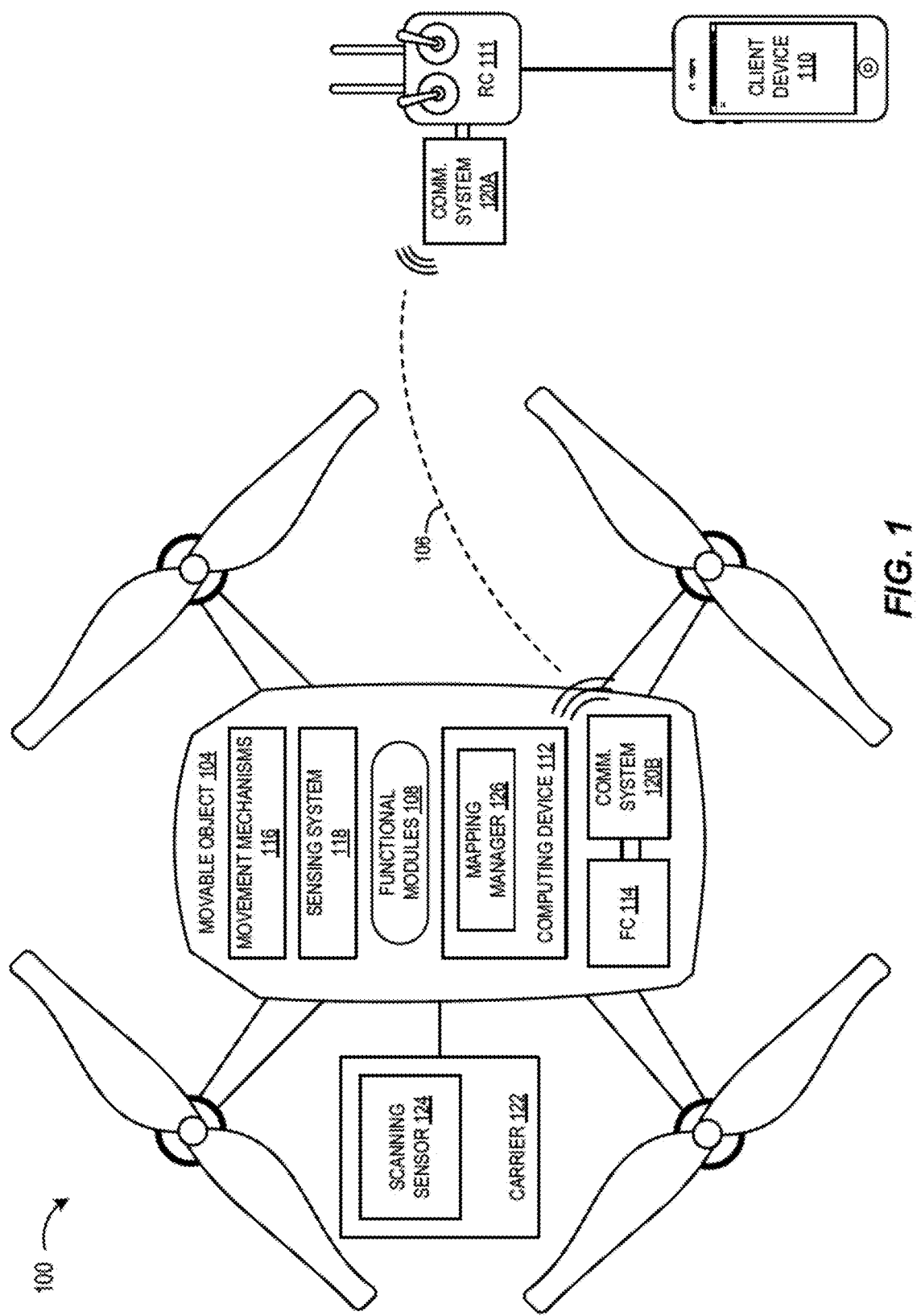
FIG. 1 illustrates an example of a movable object in a movable object environment, in accordance with various embodiments.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The following description of the invention describes target mapping using a movable object. For simplicity of explanation, an unmanned aerial vehicle (UAV) is generally used as an example of a movable object. It will be apparent to those skilled in the art that other types of movable objects can be used without limitation.

Embodiments enable a movable object to map a target environment in real-time using data collected from a positioning sensor and a scanning sensor. Alternative embodiments may take advantage of post-processing to generate a map following completion of one or more data collection missions executed by one or more movable objects. For example, the various embodiments may utilize scan matching techniques for mapping a complex target environment.

Embodiments can be used to provide LiDAR-based real-time mapping for various applications, such as construction, surveying, target inspection, etc. Rather than collecting data to be post-processed into a map representation of the target, a map can be constructed in real-time, enabling a version of the map to be rendered on a client device as it is collected. Such live rendering may enable the user to determine if any areas within the target environment have not been scanned by a scanning sensor electronically coupled to the movable object. Additionally, a high-density version of the map can be generated during the mapping mission and downloaded upon return of the movable object. In various embodiments, a mapping manager may utilize a parallel computing architecture to perform the real-time mapping while the movable object is performing its mapping mission. In some embodiments, the mapping data may be output as a LiDAR Data Exchange File (LAS) which may be used by various tools to render the map of the target environment and/or use the mapping data for further processing, planning, etc. Metadata embedded in the LAS output file can facilitate integration of the map with various third-party tools. In various embodiments, the map may be output in various file formats depending on user preferences.

In some embodiments, a mapping manager can receive mapping data from a scanning sensor (such as a LiDAR sensor or other sensor that provides high resolution scanning of a target environment), and positioning data from a positioning sensor (e.g., a global positioning system (GPS) module, real-time kinematic (RTK) module, an inertial measurement unit (IMU) module, or other positioning sensor). The mapping data can be geo-referenced using the positioning data and used to construct the map of the target environment. Embodiments objectively geo-reference the mapping data, enabling various target environments to be mapped regardless of environment complexity.

FIG. 1 illustrates an example of a movable object in a movable object environment 100, in accordance with various embodiments. As shown in FIG. 1, client device 110 in a movable object environment 100 can communicate with a movable object 104 via a communication link 106. The movable object 104 can be an unmanned aircraft, an unmanned vehicle, a handheld device, and/or a robot. The client device 110 can be a portable personal computing device, a smart phone, a remote control, a wearable computer, a virtual reality/augmented reality system, and/or a personal computer. Additionally, the client device 110 can include a remote controller 111 and communication system 120A, which is responsible for handling the communication between the client device 110 and the movable object 104 via communication system 120B. For example, the communication between the client device 110 and the movable object 104 (e.g., an unmanned aircraft) can include uplink and downlink communication. The uplink communication can be used for transmitting control signals, the downlink communication can be used for transmitting media or video stream, mapping data collected scanning sensors, or other sensor data collected by other sensors.

In accordance with various embodiments, the communication link 106 can be (part of) a network, which is based on various wireless technologies, such as the WiFi, Bluetooth, 3G/4G, and other radio frequency technologies. Furthermore, the communication link 106 can be based on other computer network technologies, such as the internet technology, or any other wired or wireless networking technology. In some embodiments, the communication link 106 may be a non-network technology, including direct point-to-point connections such as universal serial bus (USB) or universal asynchronous receiver-transmitter (UART).

In various embodiments, movable object 104 in a movable object environment 100 can include a payload assembly 122 and a payload, such as a scanning sensor 124 (e.g., a LiDAR sensor). Although the movable object 104 is described generally as an aircraft, this is not intended to be limiting, and any suitable type of movable object can be used. One of skill in the art would appreciate that any of the embodiments described herein in the context of aircraft systems can be applied to any suitable movable object (e.g., a UAV). In some instances, the payload may be provided on the movable object 104 without requiring the payload assembly.

In accordance with various embodiments, the movable object 104 may include one or more movement mechanisms 116 (e.g., propulsion mechanisms), a sensing system 118, and a communication system 120B. The movement mechanisms 116 can include one or more of rotors, propellers, blades, engines, motors, wheels, axles, magnets, nozzles, animals, or human beings. For example, the movable object may have one or more propulsion mechanisms. The movement mechanisms may all be of the same type. Alternatively, the movement mechanisms can be different types of movement mechanisms. The movement mechanisms 116 can be mounted on the movable object 104 (or vice-versa), using any suitable means such as a support element (e.g., a drive shaft). The movement mechanisms 116 can be mounted on any suitable portion of the movable object 104, such on the top, bottom, front, back, sides, or suitable combinations thereof.

In some embodiments, the movement mechanisms 116 can enable the movable object 104 to take off vertically from a surface or land vertically on a surface without requiring any horizontal movement of the movable object 104 (e.g., without traveling down a runway). Optionally, the movement mechanisms 116 can be operable to permit the movable object 104 to hover in the air at a specified position and/or orientation. One or more of the movement mechanisms 116 may be controlled independently of the other movement mechanisms, for example by an application executing on client device 110, computing device 112, or other computing device in communication with the movement mechanisms. Alternatively, the movement mechanisms 116 can be configured to be controlled simultaneously. For example, the movable object 104 can have multiple horizontally oriented rotors that can provide lift and/or thrust to the movable object. The multiple horizontally oriented rotors can be actuated to provide vertical takeoff, vertical landing, and hovering capabilities to the movable object 104. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 104 (e.g., with respect to up to three degrees of translation and up to three degrees of rotation). As discussed further herein, a controller, such as flight controller 114, can send movement commands to the movement mechanisms 116 to control the movement of movable object 104. These movement commands may be based on and/or derived from instructions received from client device 110, computing device 112, or other entity.

The sensing system 118 can include one or more sensors that may sense the spatial disposition, velocity, and/or acceleration of the movable object 104 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 118 can be used to control the spatial disposition, velocity, and/or orientation of the movable object 104 (e.g., using a suitable processing unit and/or control module). Alternatively, the sensing system 118 can be used to provide data regarding the environment surrounding the movable object, such as weather conditions, proximity to potential obstacles, location of geographical features, location of manmade structures, and the like.

The communication system 120B enables communication with client device 110 via communication link 106, which may include various wired and/or wireless technologies as discussed above, and communication system 120A. The communication system 120A or 120B may include any number of transmitters, receivers, and/or transceivers suitable for wireless communication. The communication may be one-way communication, such that data can be transmitted in only one direction. For example, one-way communication may involve only the movable object 104 transmitting data to the client device 110, or vice-versa. The data may be transmitted from one or more transmitters of the communication system 120B of the movable object to one or more receivers of the communication system 120A of the client device, or vice-versa. Alternatively, the communication may be two-way communication, such that data can be transmitted in both directions between the movable object 104 and the client device 110. The two-way communication can involve transmitting data from one or more transmitters of the communication system 120B of the movable object 104 to one or more receivers of the communication system 120A of the client device 110, and transmitting data from one or more transmitters of the communication system 120A of the client device 110 to one or more receivers of the communication system 120B of the movable object 104.

In some embodiments, a client device 110 may communicate with a mapping manager 126 installed on computing device 112 over a transparent transmission channel of a communication link 106. The transparent transmission channel can be provided through the flight controller of the movable object which allows the data to pass through unchanged (e.g., "transparent") to the mapping manager or other application on computing device 112. In some embodiments, mapping manager 126 may utilize a software development kit (SDK), application programming interfaces (APIs), or other interfaces made available by the movable object, computing device, scanning sensor 124, etc. In various embodiments, the mapping manager may be implemented by one or more processors on movable object 104 (e.g., flight controller 114 or other processors), computing device 112, remote controller 111, client device 110, or other computing device in communication with movable object 104. In some embodiments, mapping manager 126 may be implemented as an application executing on client device 110, computing device 112, or other computing device in communication with movable object 104.

In some embodiments, an application executing on client device 110 or computing device 112 can provide control data to one or more of the movable object 104, payload assembly 122, and payload 124 and receive information from one or more of the movable object 104, payload assembly 122, and payload 124 (e.g., position and/or motion information of the movable object, payload assembly or payload; data sensed by the payload such as image data captured by a payload camera or mapping data captured by a LiDAR sensor; and data generated from image data captured by the payload camera or LiDAR data generated from mapping data captured by the LiDAR sensor).

In some embodiments, the control data may result in a modification of the location and/or orientation of the movable object (e.g., via control of the movement mechanisms 116), or a movement of the payload with respect to the movable object (e.g., via control of the payload assembly 122). The control data from the application may result in control of the payload, such as control of the operation of scanning sensor 124, a camera or other image capturing device (e.g., taking still or moving pictures, zooming in or out, turning on or off, switching imaging modes, changing image resolution, changing focus, changing depth of field, changing exposure time, changing viewing angle or field of view).

In some instances, the communications from the movable object, payload assembly and/or payload may include information obtained from one or more sensors (e.g., of the sensing system 118 or of the scanning sensor 124 or other payload) and/or data generated based on the sensing information. The communications may include sensed information obtained from one or more different types of sensors (e.g., GPS sensors, motion sensors, inertial sensors, proximity sensors, or image sensors). Such information may pertain to the position (e.g., location, orientation), movement, or acceleration of the movable object, payload assembly, and/or payload. Such information from a payload may include data captured by the payload or a sensed state of the payload.

In some embodiments, computing device 112 can be added to the movable object. The computing device can be powered by the movable object and can include one or more processors, such as CPUs, GPUs, field programmable gate arrays (FPGAs), system on chip (SoC), application-specific integrated circuit (ASIC), or other processors. The computing device can include an operating system (OS), such as Windows 10®, Linux®, Unix®-based operating systems, or other OS. Mission processing can be offloaded from the flight controller 114 to the computing device 112. In various embodiments, the mapping manager 126 can execute on the computing device 112, client device 110, payload 124, a remote server (not shown), or other computing device.

In some embodiments, mapping manager 126 can be used to provide LiDAR-based real-time mapping for various applications, such as construction, surveying, target inspection, etc. Rather than collecting data to be post-processed into a map representation of the target, a map can be constructed in real-time, enabling a version of the map to be rendered on client device 110 as it is collected. Such live rendering may enable the user to determine if any areas within the target environment have not been scanned by scanning sensor 124. Additionally, another version of the map may be downloaded and used upon return of the movable object. In various embodiments, the mapping manager 126 may utilize a parallel computing architecture in computing device 112 to perform the real-time mapping. In some embodiments, the mapping manager 126 may perform data compression to transform a dense map into a sparse map to be rendered on client device 110. By way of compressing the dense map into the sparse map, the mapping manager 126 may be used to reduce data size required for transmission from the movable object 104 to the client device 110, and thus, data transmission time and bandwidth are saved for efficient real-time map rendering. In such embodiments, the live rendering of the map may be a lower resolution or a compressed data version of the map (i.e., a sparse map) compared to the version obtained from the movable object upon its return from scanning the target environment (i.e., a dense map). In some embodiments, the map may be output as a LiDAR Data Exchange File (LAS) which may be used by various tools to render the map of the target environment and/or use the mapping data for further processing, planning, etc. Metadata embedded in the LAS output file can facilitate integration of the map with various third-party tools. In various embodiments, the map may be output in various file formats depending on user preferences.

Mapping manager 126 can receive mapping data from scanning sensor 124. As discussed, scanning sensor 124 may be a LiDAR sensor or other sensor that provides high resolution scanning of a target environment. The mapping manager 126 may also receive positioning data from a positioning sensor (e.g., a GPS module, RTK module, or other positioning sensor). In some embodiments, the positioning sensor may be part of functional modules 108, sensing system 118, or a separate module coupled to movable object 104 which provides positioning data for the movable object. The mapping data can be geo-referenced using the positioning data and used to construct the map of the target environment. Prior methods of 3D mapping have relied on complex environments that are conducive to scan-matching. Unlike prior mapping systems, which require complex environments in order to use scan-matching to prepare the map, embodiments objectively geo-reference the mapping data. This allows for various target environments to be mapped regardless of environment complexity.

Additional details of the movable object architecture are described below with respect to FIG. 2.

Figure 2:
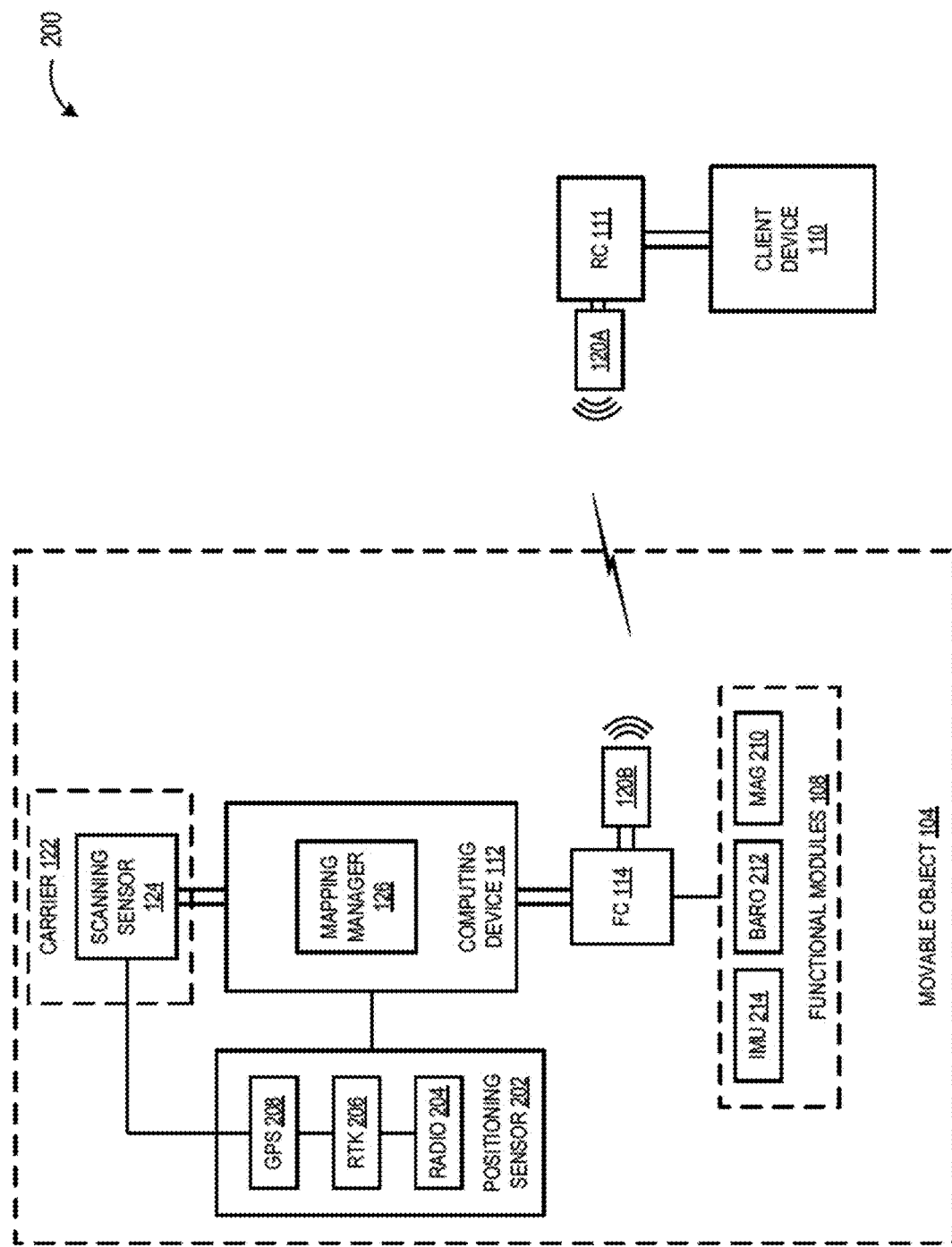
FIG. 2 illustrates an example of a movable object architecture in a movable object environment, in accordance with various embodiments.

FIG. 2 illustrates an example 200 of a movable object architecture in a movable object environment, in accordance with various embodiments. As shown in FIG. 2, a movable object 104 can include a computing device 112 and flight controller 114. The computing device 112 can connect to the scanning sensor 124 via a high bandwidth connection, such as Ethernet or universal serial bus (USB). The computing device 112 may also connect to a positioning sensor 202 over a low bandwidth connection, such as universal asynchronous receiver-transmitter (UART). As discussed, the positioning sensor 202 may be included as a separate module (as shown in FIG. 2) or may be included as part of functional modules 108 or sensing system 118. Positioning sensor 202 may include a radio 204, such as a 4G, 5G, or other cellular or mobile network radio. The radio 204 may be used by RTK module 206 to enhance positioning data collected by GPS module 208. Although a GPS module is shown in FIG. 2, any global navigation satellite service may be used, such as GLOSNASS, Galileo, BeiDou, etc. RTK module 206 can receive a reference signal from a reference station using radio 204 and provide a correction to the positioning data provided by GPS module 208. Additionally, GPS module 208 can output a clock signal, such as a pulse per second (1PPS) signal, to the scanning sensor 124. This allows for the scanning sensor and the GPS sensor to apply synchronized time stamps to their collected data using the same clock signal.

In various embodiments, the computing device 112 can connect to one or more high bandwidth components, such as one or more cameras, a stereo vision module, or payload. The computing device 112 can connect to the flight controller 114 via UART and/or USB to send and receive data to and from the remote control via communication system 120B. In various embodiments, the computing device 112 may include one or more CPUs, GPUs, field programmable gate arrays (FPGA), systems on chip (SoC), or other processor(s).

Flight controller 114 can connect to various functional modules 108, such as magnetometer 210, barometer 212, and inertial measurement unit (IMU) 214. In some embodiments, communication system 120B can connect to computing device 112 instead of, or in addition to, flight controller 114. In some embodiments, sensor data collected by the one or more functional modules 108 and the positioning sensor 202 can be passed from the flight controller 114 to the computing device 112.

In some embodiments, flight controller 114 and computing device 112 can be implemented as separate devices (e.g., separate processors on separate circuit boards). Alternatively, one or more of the flight controller 114 and computing device 112 can be implemented as a single device, such as an SoC. In various embodiments, computing device 112 may be removable from the movable object.

Figure 3:
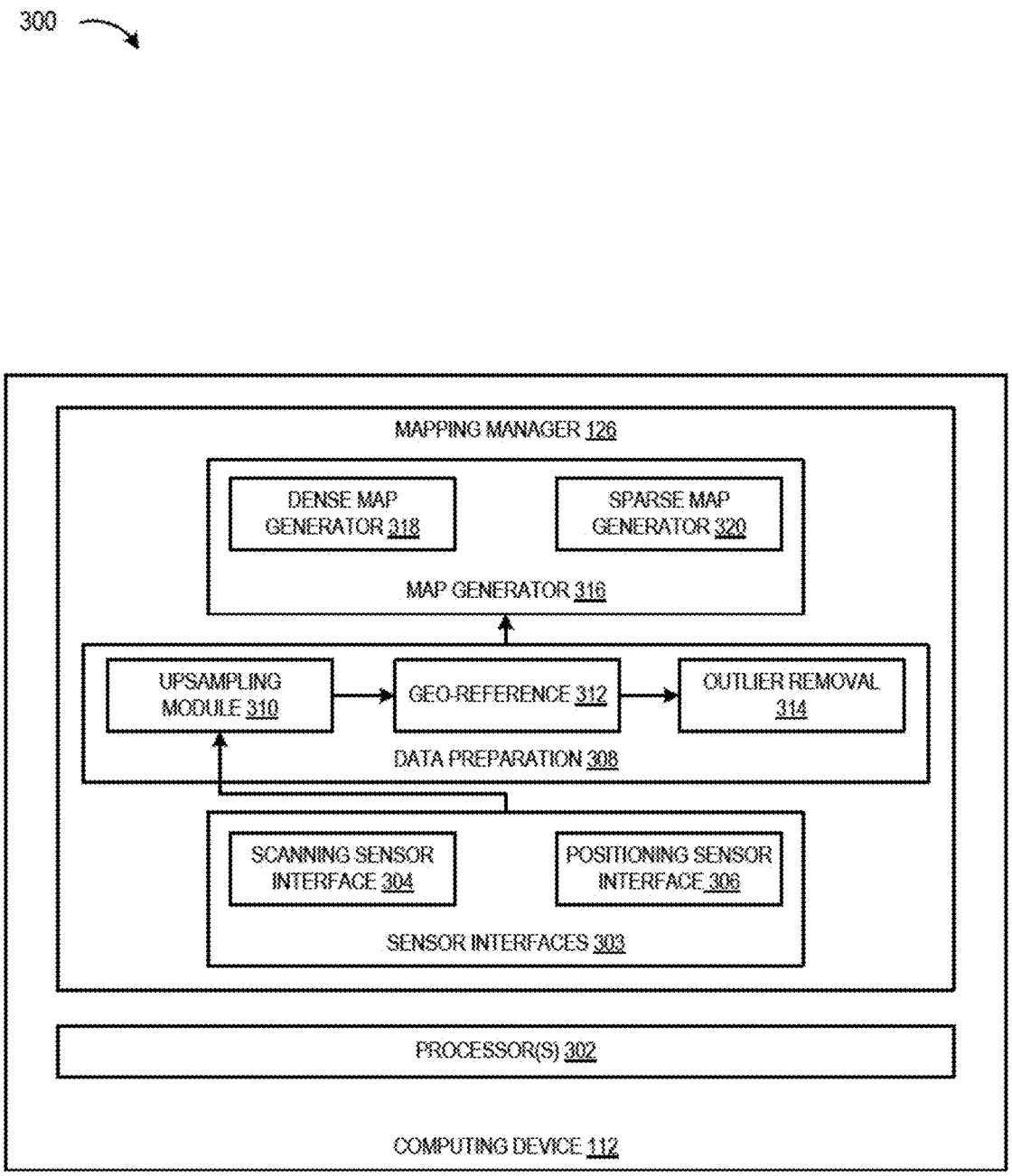
FIG. 3 illustrates an example of a mapping manager in a movable object environment, in accordance with various embodiments.

FIG. 3 illustrates an example 300 of a mapping manager 126 in a movable object environment, in accordance with various embodiments. As shown in FIG. 3, a mapping manager 126 may execute on one or more processors 302 of computing device 112. The one or more processors 302 may include CPUs, GPUs, FGPAs, SoCs, or other processors, and may be part of a parallel computing architecture implemented by computing device 112. The mapping manager 126 may include sensor interfaces 303, data preparation module 308, and map generator 316.

Sensor interfaces 303 can include a scanning sensor interface 304 and a positioning sensor interface 306. The sensor interfaces 303 may include hardware and/or software interfaces. The scanning sensor interface 304 can receive data from the scanning sensor (e.g., a LiDAR or other scanning sensor) and the positioning sensor interface 306 can receive data from the positioning sensor (e.g., a GPS sensor, an RTK sensor, an IMU sensor, and/or other positioning sensors or a combination thereof). In various embodiments, the scanning sensor may produce mapping data in a point cloud format. The point cloud of the mapping data may be a three-dimensional representation of the target environment. In some embodiments, the point cloud of the mapping data may be converted to a matrix representation. The positioning data may include GPS coordinates for the movable object and, in some embodiments, may include roll, pitch, and yaw values associated with the movable object corresponding to each GPS coordinate. The roll, pitch, and yaw values may be obtained from the positioning sensor, such as an inertial measurement unit (IMU), or other sensor. As discussed, the positioning data may be obtained from an RTK module, which corrects the GPS coordinates based on a correction signal received from a reference station. In some embodiments, the RTK module may produce a variance value associated with each output coordinate. The variance value may represent the accuracy of the corresponding positioning data. For example, if the movable object is performing sharp movements, the variance value may go up, indicating less accurate positioning data has been collected. The variance value may also vary depending on atmospheric conditions, leading to different accuracies measured by the movable object depending on the particular conditions present when the data was collected.

The positioning sensor and scanning sensor may share clock circuitry. For example, the positioning sensor may include clock circuitry and output a clock signal to the scanning sensor. In some embodiments, a separate clock circuit may output a clock signal to both the scanning sensor and the positioning sensor. As such, the positioning data and the mapping data may be time-stamped using the shared clock signal.

In some embodiments, the positioning sensor and scanning sensor may output data with differing delays. For example, the positioning sensor and the scanning sensor may not start generating data at the same time. As such, the positioning data and/or mapping data may be buffered to account for the delay. In some embodiments, a buffer size may be chosen based on the delay between the output of each sensor. In some embodiments, mapping manager can receive the data from the positioning sensor and scanning sensor and output synchronized data using the timestamps shared by the sensor data with respect to the shared clock signal. This enables the positioning data and mapping data to be synchronized before further processing. Additionally, the frequency of the data obtained from each sensor may be different. For example, the scanning sensor may be producing data in the range of hundreds of kHz, while the positioning sensor may be producing data in the range of hundreds of Hz. Accordingly, to ensure each point of the mapping data has corresponding positioning data, upsampling module 310 can interpolate the lower frequency data to match the higher frequency data. For example, assuming the positioning data is produced by the positioning sensor at 100 Hz and the mapping data is produced by the scanning sensor (e.g., a LiDAR sensor) at 100 kHz, the positioning data may be upsampled from 100 Hz to 100 kHz. Various upsampling techniques may be used to upsample the positioning data. For example, a linear fit algorithm, such as least squares, may be used. In some embodiments, non-linear fit algorithms may be used to upsample the positioning data. Additionally, the roll, pitch, yaw values of the positioning data may also be interpolated to match the frequency of the mapping data. In some embodiments, the roll, pitch, and yaw values may be spherical linear interpolated (SLERP) to match the number of points in the mapping data. The time stamps may likewise be interpolated to match the interpolated positioning data.

Once the positioning data has been upsampled and synchronized with the mapping data by upsampling module 310, geo-reference module 312 can convert the matrix representation of the mapping data from the frame of reference (or the reference coordinate system) in which it was collected (e.g., scanner reference frame or scanner reference coordinate system) to a desired frame of reference (or a desired reference coordinate system). For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

Each point in the point cloud of the mapping data is associated with a position in the scanner reference frame that is determined relative to the scanning sensor. The positioning data of the movable object, produced by the positioning sensor, may then be used to convert this position in the scanner reference frame to the output reference frame in a world coordinate system, such as a GPS coordinate system. For example, the position of the scanning sensor in the world coordinate system is known based on the positioning data. In some embodiments, the positioning sensor and the scanning module may be offset (e.g., due to being located at different positions on the movable object). In such embodiments, a further correction factoring in this offset may be used to convert from the scanner reference frame to the output reference frame (e.g., each measured position in the positioning data may be corrected using the offset between the positioning sensor and the scanning sensor). For each point in the point cloud of the mapping data, the corresponding positioning data can be identified using the time stamp. The point can then be converted to the new reference frame. In some embodiments, the scanner reference frame can be converted into a horizontal reference frame using the interpolated roll, pitch, and yaw values from the positioning data. Once the mapping data has been converted into the horizontal reference frame, it may be further converted into a Cartesian frame or other output reference frame. Once each point has been converted, the result is a geo-referenced point cloud, with each point in the point cloud now referenced to the world coordinate system. In some embodiments, the geo-referenced point cloud can be provided to map generator 316 before performing outlier removal to remove outlier data from the geo-referenced point cloud.

After the geo-referenced point cloud has been produced, outlier removal module 314 can remove outlier data from the geo-referenced point cloud. In some embodiments, the geo-referenced point cloud may be downsampled, reducing the number of outliers in the data. Downsampling of this data may be performed using voxels. In some embodiments, the points in each voxel may be averaged, and one or more averaged points may be output per voxel. As such, outlier points will be removed from the data set in the course of averaging the points in each voxel. In various embodiments, the resolution of the voxels (e.g., the size of each voxel), may be arbitrarily defined. This allows for sparse and dense downsampled point clouds to be produced. The resolution may be determined by the user, or by the mapping manager based on, e.g., available computing resources, user preferences, default values, or other application-specific information. For example, a lower resolution (e.g., larger voxel size) may be used to produce a sparse downsampled point cloud for visualization on a client device or a mobile device. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. In some embodiments, the outlier removal technique may be selectable by the user or be automatically selected by the mapping manager. In some embodiments, outlier removal may be disabled.

As discussed, the point cloud data may be a three-dimensional representation of the target environment. This 3D representation can be divided into voxels (e.g., 3D pixels).

After statistical outlier removal, the resulting point cloud data can be provided to map generator 316. In some embodiments, the map generator 316 may include a dense map generator 318 and/or a sparse map generator 320. In such embodiments, dense map generator 318 can produce a high-density map from the point cloud data received before outlier removal, and sparse map generator 320 can produce a low-density map from the sparse downsampled point cloud data received after outlier removal. In other embodiments, dense map generator 318 and sparse map generator 320 may produce a high-density map and a low-density map separately from the point cloud received both after outlier removal. In such embodiments, each map generator may generate the output map using the same process but may vary the size of the voxels to produce high-density or low-density maps. In some embodiments, the low-density map can be used by a client device or a mobile device to provide real-time visualization of the mapping data. The high-density map can be output as a LIDAR Data Exchange File (LAS) or other file type to be used with various mapping, planning, analysis, or other tools.

The map generator may use the point cloud data to perform a probabilistic estimation of the position of points in the map. For example, the map generator may use a 3D mapping library, such as OctoMap to produce the output map. The map generator can divide the point cloud data into voxels. For each voxel, the map generator can determine how many points are in the voxel and, based on the number of points and the variance associated with each point, determine the probability that a point is in that voxel. The probability may be compared to an occupancy threshold and, if the probability is greater than the occupancy threshold, a point may be represented in that voxel in the output map. In some embodiments, the probability that a given voxel is occupied can be represented as:

$$P(n \mid z_{1:t}) = \left[1 + \frac{1-P(n \mid z_t)}{P(n \mid z_t)} \frac{1-P(n \mid z_{1:t-1})}{P(n \mid z_{1:t-1})} \frac{P(n)}{1-P(n)}\right]^{-1}$$

The probability $P(n|z_{1:t})$ of a node n being occupied is a function of the current measurement $z_1$, a prior probability $P(n)$, and the previous estimate $P(n|z_{1:t-1})$. Additionally, $P(n|z_t)$ represents the probability that voxel n is occupied given the measurement $z_t$. This probability may be augmented to include the variance of each point, as measured by the positioning sensor, as represented by the following equations:

$$P(n) = \frac{1}{2} P_x(x, \mu_x, \sigma_x^2) P_y(y, \mu_y, \sigma_y^2) P_z(z, \mu_z, \sigma_z^2) + \frac{1}{2}$$

$$P(n, \mu, \sigma^2) = \frac{1}{\sqrt{2\pi\sigma^2}} e^{-\frac{(x-\mu)^2}{2\sigma^2}}$$

In the equations above, $P(n)$ represents the total probability that a voxel n is occupied. The use of ½ in the above equation is implementation specific, such that the probability is mapped to a range of ½-1. This range may vary, depending on the particular implementation in use. In the above equations, the total probability is the product of probabilities calculated for the x, y, and z dimensions. The probability in each dimension may be determined based on the mean, µ, for each point in that dimension, and the variance, $\sigma^2$, of each measurement in a given dimension, with x, y, and z corresponding to the coordinate values of a given point. A large number of points near the mean point in a given voxel may increase the probability, while a more diffuse collection of points in the voxel may lower the probability. Likewise, a large variance associated with the data (e.g., indicating lower accuracy position data has been collected) may lower the probability while a lower variance may increase the probability. $P(n,\mu,\sigma^2)$ represents the Gaussian distribution for the voxel, given the mean and variance values of the points in that voxel.

If the total probability of a voxel being occupied is greater than a threshold occupancy value, then a point can be added to that voxel. In some embodiments, all of the points in that voxel can be averaged, and the resulting mean coordinate can be used as the location of the point in that voxel. This improves the accuracy of the resulting map over alternative methods, such as using the center point of an occupied voxel as the point, which may result in skewed results depending on the resolution of the voxels. In various embodiments, the occupancy threshold can be set based on the amount of processing resources available and/or based on the acceptable amount of noise in the data for a given application. For example, the occupancy threshold can be set to a default value of 70%. A higher threshold can be set to reduce noise. Additionally, the occupancy threshold may be set depending on the quality of the data being collected. For example, data collected under one set of conditions may be high quality (e.g., low variance) and a lower occupancy threshold can be set, while lower quality data may necessitate a higher occupancy threshold.

The resulting map data, with one point in each occupied voxel, can then be output as an LAS file, or other file format. In some embodiments, the geo-referenced point cloud data may be output without additional processing (e.g., outlier removal). In some embodiments, each point in the point cloud data may also be associated with an intensity value. The intensity value may represent various features of the object being scanned, such as elevation above a reference plane, material composition, etc. The intensity value for each point in the output map may be an average of the intensity values measured for each point in the mapping data collected by the scanning sensor (e.g., a LiDAR sensor).

Figure 4A:
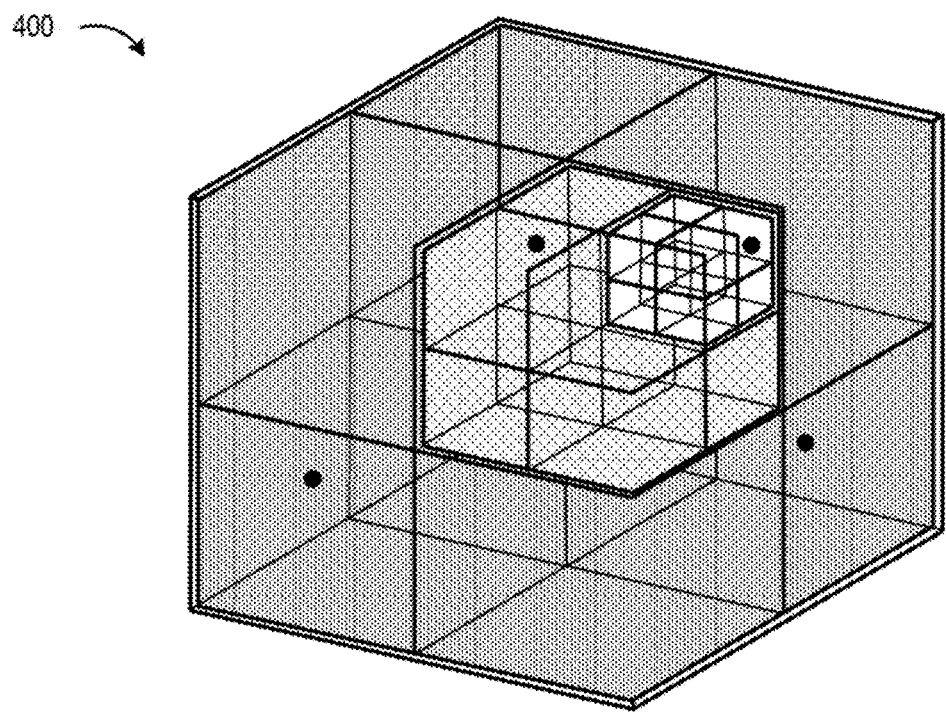
FIGS. 4A and 4B illustrate an example of a hierarchical data structure, in accordance with various embodiments.
Figure 4B:
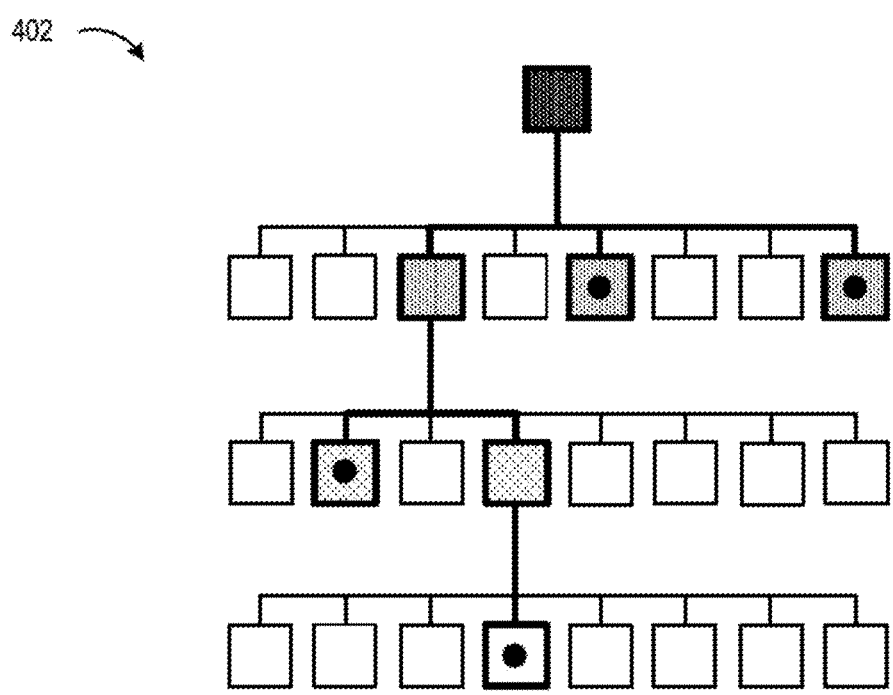

FIGS. 4A and 4B illustrate an example of a hierarchical data structure, in accordance with various embodiments. As discussed above, and as shown in FIG. 4A, data representing a 3D environment 400 can be divided into a plurality of voxels. As shown in FIG. 4A, the target environment can be divided into eight voxels, with each voxel being further divided into eight sub-voxels, and each sub-voxel divided into eight further smaller sub-voxels. Each voxel may represent a different volumetric portion of the 3D environment. The voxels may be subdivided until a smallest voxel size is reached. The resulting 3D environment can be represented as a hierarchical data structure 402, where the root of the data structure represents the entire 3D environment, and each child node represents a different voxel in different hierarchy within the 3D environment.

Figure 5B:
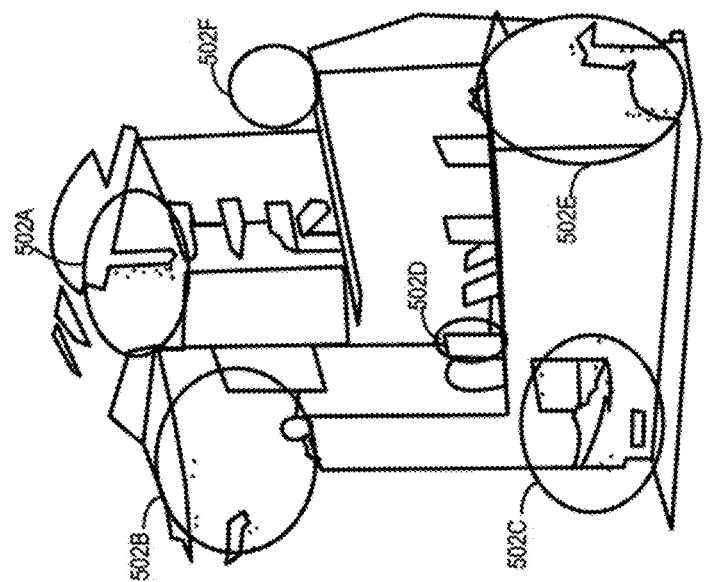
FIGS. 5A and 5B illustrate an example of outlier removal in mapping data, in accordance with various embodiments.
Figure 5A:
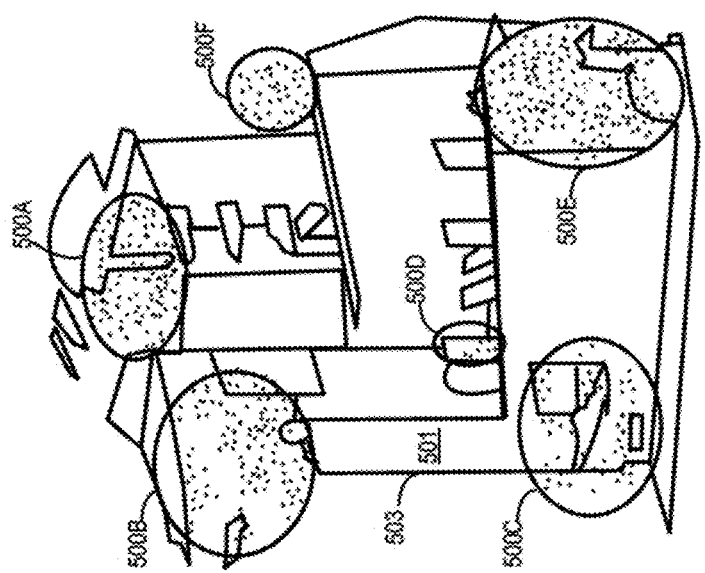

FIGS. 5A and 5B illustrate an example of outlier removal in mapping data, in accordance with various embodiments. As shown in FIG. 5A, when a target object is scanned, it may be represented as a plurality of points, with those points clustered on different parts of the object, including surfaces (such as surface 501), edges (such as edge 503), and other portions of the target object in the target environment. For simplicity of depiction, these surfaces, edges, etc. are shown solid. In various regions 500A-500F of the data, there are additional outlier points. This may be most noticeable in regions of empty space, as shown in FIG. 5A. These points are diffuse, as compared to the more densely packed points of the surfaces and edges of the target object. Outlier removal may be used to eliminate or reduce the number of these points in the data. As discussed above, the geo-referenced point cloud data may be downsampled, reducing the number of outliers in the data. Additionally, or alternatively, outliers may be removed statistically. For example, the distance from each point to its nearest neighbor may be determined and statistically analyzed. If the distance from a point to its nearest neighbor is greater than a threshold value (e.g., a standard deviation of the nearest neighbor distances in the point cloud), then that point may be removed from the point cloud. As shown in FIG. 5B, following outlier removal, the regions of the point cloud data 502A-502F have been reduced, providing a cleaner 3D map.

FIG. 6 illustrates an example 600 of intensity values in mapping data, in accordance with various embodiments. As shown in FIG. 6, one example of intensity values may be to represent elevation above a reference plane. In this example, different elevation ranges may be assigned a different intensity value 602-606, as depicted here using greyscale coloration. In various embodiments, intensity may be represented using different colors to represent different values or ranges of values. Additionally, intensity may be used to represent different materials being scanned. For example, steel and concrete will absorb and reflect the incident radiation produced by the scanning sensor differently, enabling the scanning sensor to identify different materials in use. Each material may be encoded as a different intensity value associated with each point and represented by a different color in the output map. Additionally, although the example shown in FIG. 6 shows three greyscale colors representing different elevation ranges, in various embodiments, continuous gradients of colors may be used to represent continuous changes in elevation value above a reference plane.

Figure 7:
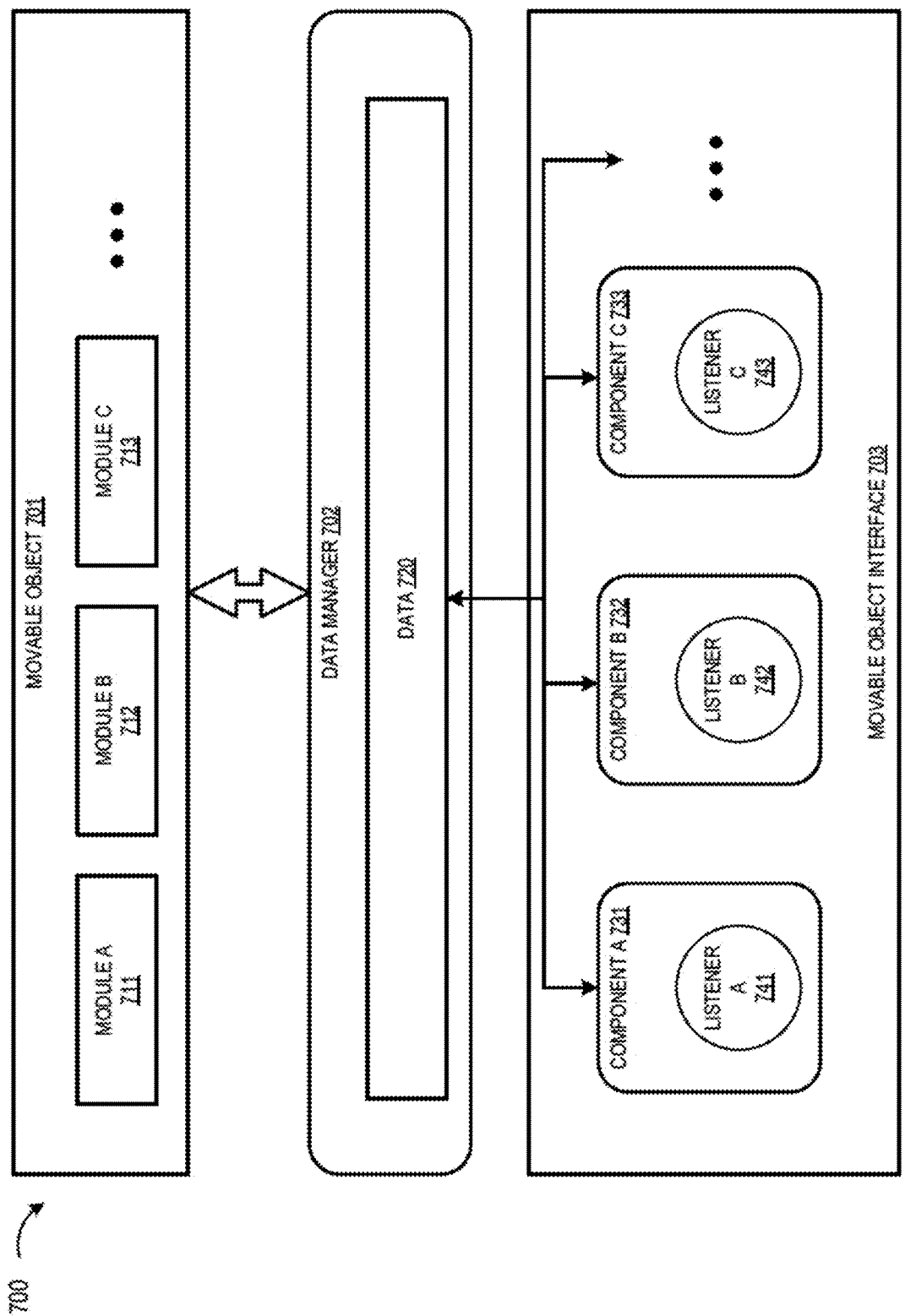
FIG. 7 illustrates an example of supporting a movable object interface in a software development environment, in accordance with various embodiments.

FIG. 7 illustrates an example of supporting a movable object interface in a software development environment, in accordance with various embodiments. As shown in FIG. 7, a movable object interface 703 can be used for providing access to a movable object 701 in a software development environment 700, such as a software development kit (SDK) environment. In some embodiments, the movable object interface 703, may render a real-time map generated by the mapping manager and other interfacing components for receiving user input. The real-time map may be rendered on a display of a client device or other computing device in communication with the movable object. As used herein, the SDK can be an onboard SDK implemented on an onboard environment that is coupled to the movable object 701. The SDK can also be a mobile SDK implemented on an off-board environment that is coupled to a client device or a mobile device. As discussed above, the mapping manager can be implemented using an onboard SDK coupled to the movable object 701 or a mobile SDK coupled to a client device or a mobile device to enable applications to perform real-time mapping, as described herein.

Furthermore, the movable object 701 can include various functional modules A-C 711-713, and the movable object interface 703 can include different interfacing components A-C 731-733. Each said interfacing component A-C 731-733 in the movable object interface 703 corresponds to a module A-C 711-713 in the movable object 701. In some embodiments, the interfacing components may be rendered on a user interface of a display of a client device or other computing device in communication with the movable object. In such an example, the interfacing components, as rendered, may include selectable command buttons for receiving user input/instructions to control corresponding functional modules of the movable object.

In accordance with various embodiments, the movable object interface 703 can provide one or more callback functions for supporting a distributed computing model between the application and movable object 701.

The callback functions can be used by an application for confirming whether the movable object 701 has received the commands. Also, the callback functions can be used by an application for receiving the execution results. Thus, the application and the movable object 701 can interact even though they are separated in space and in logic.

As shown in FIG. 7, the interfacing components A-C 731-733 can be associated with the listeners A-C 741-743. A listener A-C 741-743 can inform an interfacing component A-C 731-733 to use a corresponding callback function to receive information from the related module(s).

Additionally, a data manager 702, which prepares data 720 for the movable object interface 703, can decouple and package the related functionalities of the movable object 701. The data manager 702 may be onboard, that is coupled to or located on the movable object 701, which prepares the data 720 to be communicated to the movable object interface 703 via communication between the movable object 701 and a client device or a mobile device. The data manager 702 may be off board, that is coupled to or located on a client device or a mobile device, which prepares data 720 for the movable object interface 703 via communication within the client device or the mobile device. Also, the data manager 702 can be used for managing the data exchange between the applications and the movable object 701. Thus, the application developer does not need to be involved in the complex data exchanging process. In some embodiments, mapping manager 126 may be one implementation of data manager 702. In such an embodiment, the mapping manager is used for managing mapping data, including generating a map using mapping data and positioning data and rendering the generated map for display based on a default setting or a user selection.

For example, the onboard or mobile SDK can provide a series of callback functions for communicating instant messages and for receiving the execution results from a movable object. The onboard or mobile SDK can configure the life cycle for the callback functions in order to make sure that the information interchange is stable and completed. For example, the onboard or mobile SDK can establish connection between a movable object and an application on a smart phone (e.g. using an Android system or an iOS system). Following the life cycle of a smart phone system, the callback functions, such as the ones receiving information from the movable object, can take advantage of the patterns in the smart phone system and update the statements accordingly to the different stages in the life cycle of the smart phone system.

Figure 8:
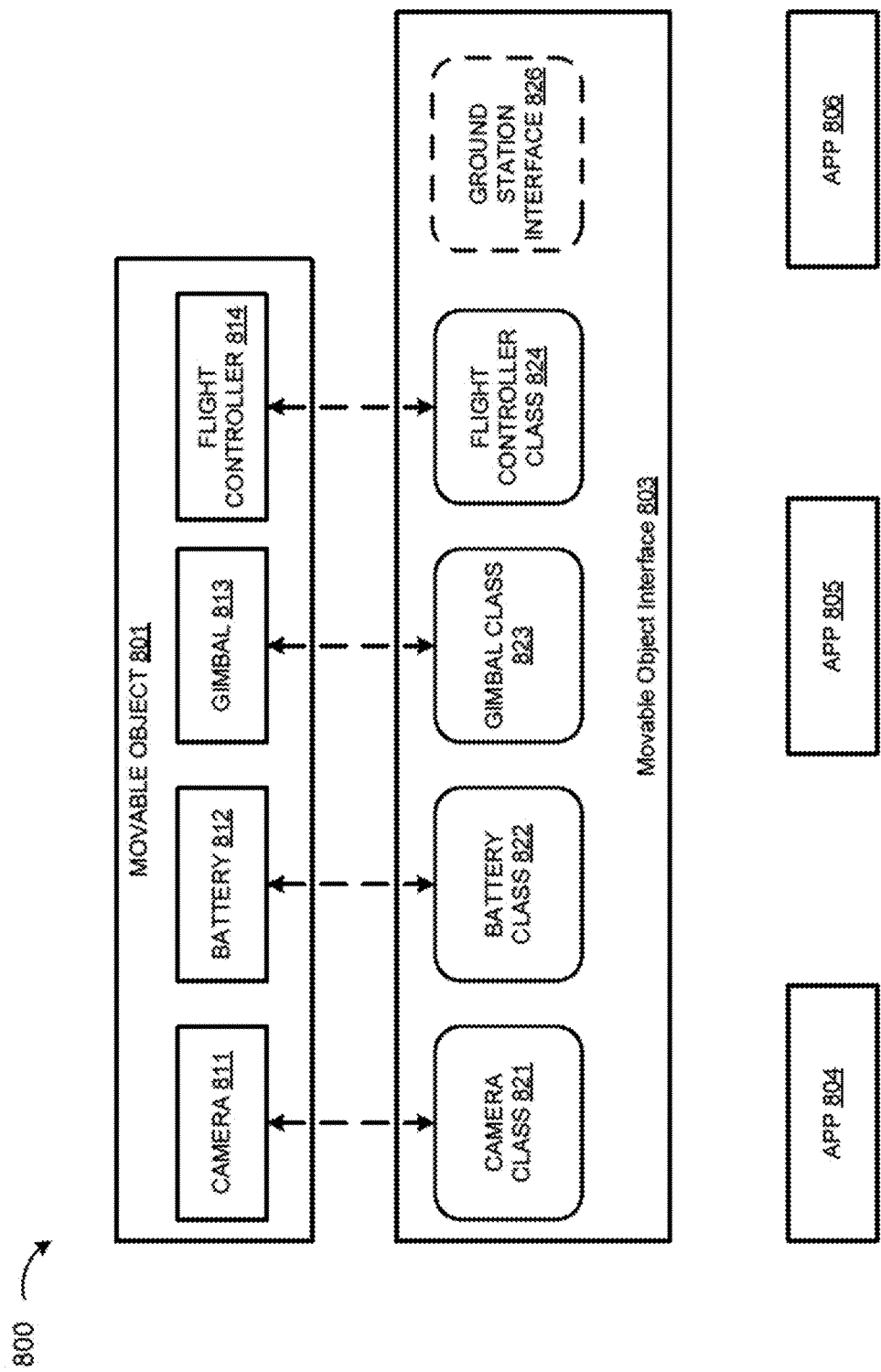
FIG. 8 illustrates an example of a movable object interface, in accordance with various embodiments.

FIG. 8 illustrates an example of a movable object interface, in accordance with various embodiments. As shown in FIG. 8, a movable object interface 803 can be rendered on a display of a client device or other computing devices representing statuses of different components of a movable object 801. Thus, the applications, e.g., APPs 804-806, in the movable object environment 800 can access and control the movable object 801 via the movable object interface 803. As discussed, these apps may include an inspection app 804, a viewing app 805, and a calibration app 806.

For example, the movable object 801 can include various modules, such as a camera 811, a battery 812, a gimbal 813, and a flight controller 814.

Correspondingly, the movable object interface 803 can include a camera component 821, a battery component 822, a gimbal component 823, and a flight controller component 824 to be rendered on a computing device or other computing devices to receive user input/instructions by way of using the APPs 804-806.

Additionally, the movable object interface 803 can include a ground station component 826, which is associated with the flight controller component 824. The ground station component operates to perform one or more flight control operations, which may require a high-level privilege.

Figure 9:
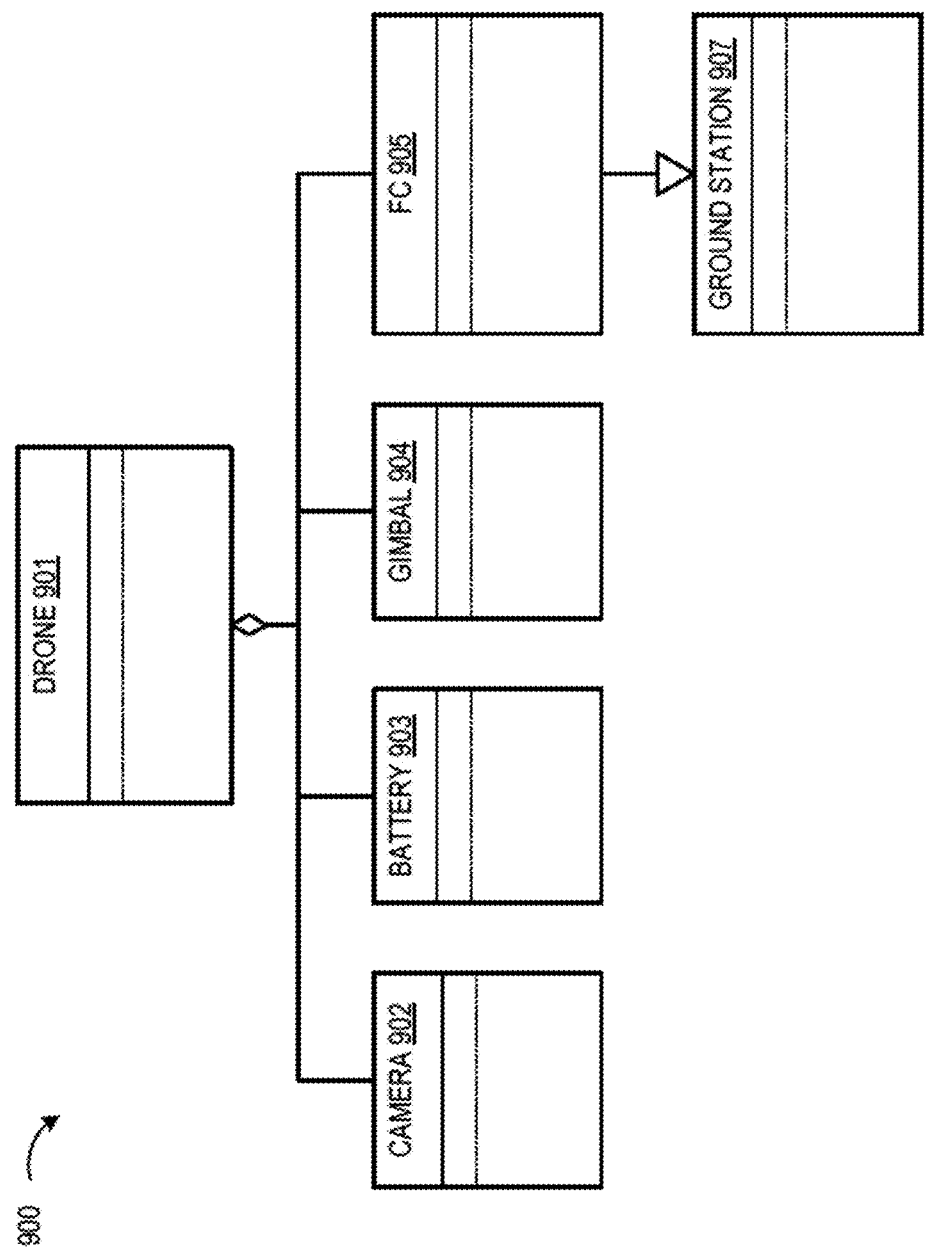
FIG. 9 illustrates an example of components for a movable object in a software development kit (SDK), in accordance with various embodiments.

FIG. 9 illustrates an example of components for a movable object in a software development kit (SDK), in accordance with various embodiments. The SDK 900 may be an onboard SDK implemented on an onboard mapping manager or a mobile SDK implemented on mapping manager located on a client device or a mobile device. The SDK 900 may correspond to all or a portion of the mapping manager described above or may be used to implement the mapping manager as a standalone application. As shown in FIG. 9, the drone class 901 in the SDK 900 is an aggregation of other components 902-907 for a movable object (e.g., a drone). The drone class 901, which have access to the other components 902-907, can exchange information with the other components 902-907 and controls the other components 902-907.

In accordance with various embodiments, an application may be accessible to only one instance of the drone class 901. Alternatively, multiple instances of the drone class 901 can present in an application.

In the SDK, an application can connect to the instance of the drone class 901 in order to upload the controlling commands to the movable object. For example, the SDK may include a function for establishing the connection to the movable object. Also, the SDK can disconnect the connection to the movable object using an end connection function. After connecting to the movable object, the developer can have access to the other classes (e.g. the camera class 902, the battery class 903, the gimbal class 904, and the flight controller class 905). Then, the drone class 901 can be used for invoking the specific functions, e.g. providing access data which can be used by the flight controller to control the behavior, and/or limit the movement, of the movable object.

In accordance with various embodiments, an application can use a battery class 903 for controlling the power source of a movable object. Also, the application can use the battery class 903 for planning and testing the schedule for various flight tasks. As battery is one of the most restricted elements in a movable object, the application may seriously consider the status of battery not only for the safety of the movable object but also for making sure that the movable object can finish the designated tasks. For example, the battery class 903 can be configured such that if the battery level is low, the movable object can terminate the tasks and go home outright. For example, if the movable object is determined to have a battery level that is below a threshold level, the battery class may cause the movable object to enter a power savings mode. In power savings mode, the battery class may shut off, or reduce, power available to various components that are not integral to safely returning the movable object to its home. For example, cameras that are not used for navigation and other accessories may lose power, to increase the amount of power available to the flight controller, motors, navigation system, and any other systems needed to return the movable object home, make a safe landing, etc.

Using the SDK, the application can obtain the current status and information of the battery by invoking a function to request information from in the Drone Battery Class. In some embodiments, the SDK can include a function for controlling the frequency of such feedback.

In accordance with various embodiments, an application can use a camera class 902 for defining various operations on the camera in a movable object, such as an unmanned aircraft. For example, in SDK, the Camera Class includes functions for receiving media data in SD card, getting & setting photo parameters, taking photo and recording videos.

An application can use the camera class 902 for modifying the setting of photos and records. For example, the SDK may include a function that enables the developer to adjust the size of photos taken. Also, an application can use a media class for maintaining the photos and records.

In accordance with various embodiments, an application can use a gimbal class 904 for controlling the view of the movable object. For example, the Gimbal Class can be used for configuring an actual view, e.g. setting a first personal view of the movable object. Also, the Gimbal Class can be used for automatically stabilizing the gimbal, in order to be focused on one direction. Also, the application can use the Gimbal Class to change the angle of view for detecting different objects.

In accordance with various embodiments, an application can use a flight controller class 905 for providing various flight control information and status about the movable object. As discussed, the flight controller class can include functions for receiving and/or requesting access data to be used to control the movement of the movable object across various regions in a movable object environment.

Using the Flight Controller Class, an application can monitor the flight status, e.g. using instant messages. For example, the callback function in the Flight Controller Class can send back the instant message every one thousand milliseconds (1000 ms).

Furthermore, the Flight Controller Class allows a user of the application to investigate the instant message received from the movable object. For example, the pilots can analyze the data for each flight in order to further improve their flying skills.

In accordance with various embodiments, an application can use a ground station class 907 to perform a series of operations for controlling the movable object.

For example, the SDK may require applications to have an SDK-LEVEL-2 key for using the Ground Station Class. The Ground Station Class can provide one-key-fly, on-key-go-home, manually controlling the drone by app (i.e. joystick mode), setting up a cruise and/or waypoints, and various other task scheduling functionalities.

In accordance with various embodiments, an application can use a communication component for establishing the network connection between the application and the movable object.

Figure 10:
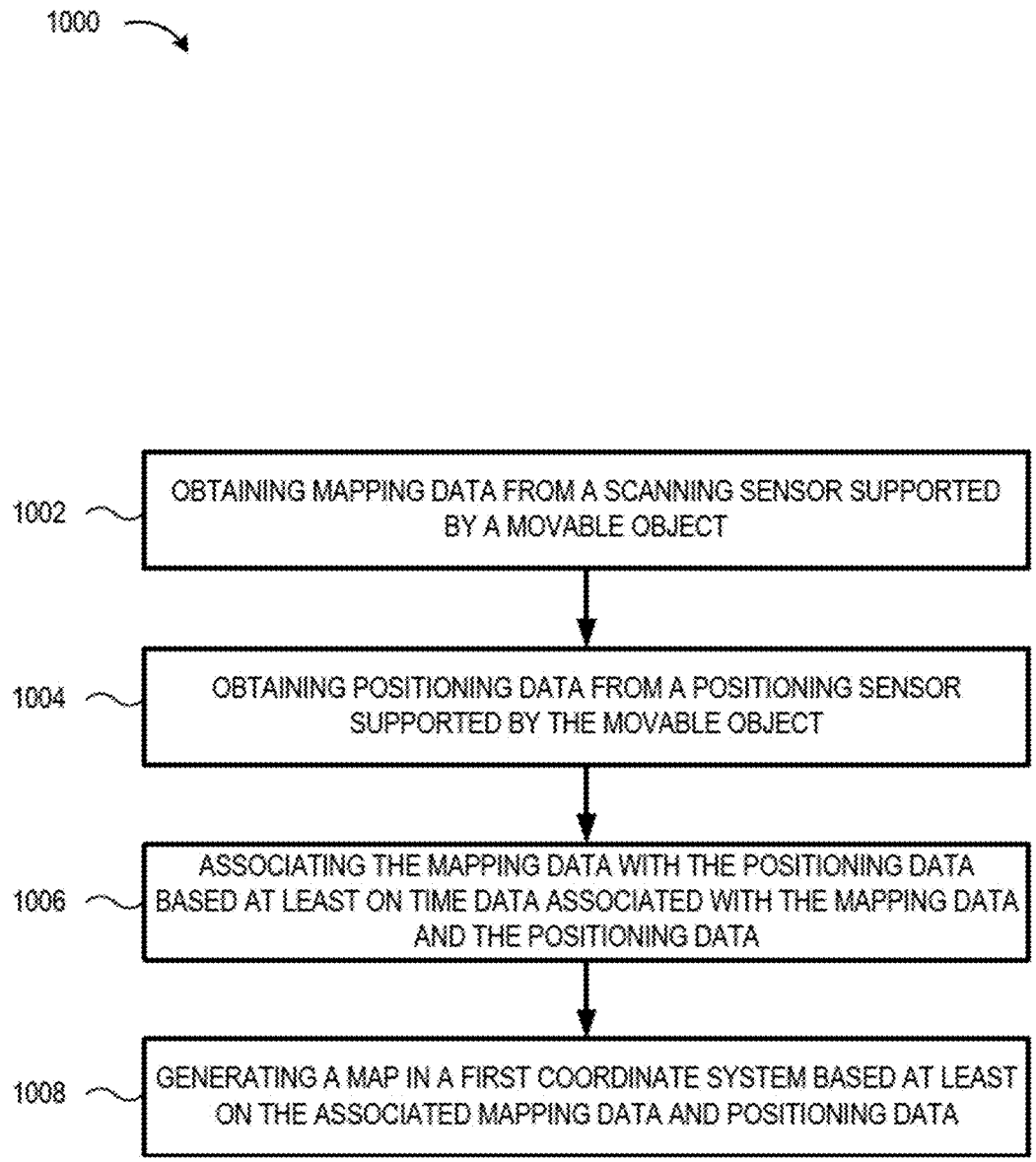
FIG. 10 shows a flowchart of a method of target mapping in a movable object environment, in accordance with various embodiments.

FIG. 10 shows a flowchart of a method of target mapping in a movable object environment, in accordance with various embodiments. At operation/step 1002, mapping data can be obtained from a scanning sensor (e.g., a LiDAR sensor) supported by a movable object (e.g., a UAV). In some embodiments, the scanning sensor can be a LiDAR sensor. At operation/step 1004, positioning data can be obtained from a positioning sensor (e.g., a GPS sensor, an RTK sensor, an IMU sensor, and/or other positioning sensors or a combination thereof) supported by the movable object (e.g., a UAV). In some embodiments, the positioning sensor can be an RTK sensor or an IMU sensor.

At operation/step 1006, the mapping data can be associated with the positioning data based at least on time data associated with the mapping data and the positioning data. In some embodiments, associating the mapping data with the positioning data may include upsampling the positioning data to include a number of positions equal to a number of points in the mapping data, and associating each point in the mapping data with a corresponding position in the upsampled positioning data. In some embodiments, the time data associated with the mapping data and the positioning data may be obtained using clock circuitry providing a reference clock signal electronically coupled to the scanning sensor and the positioning sensor.

At operation/step 1008, a map in a first coordinate system may be generated based at least on the associated mapping data and positioning data. In some embodiments, generating the map may include, for each voxel of a plurality of voxels of the map, determining one or more points from the mapping data to be located in the voxel, and determining an occupancy probability for the voxel based at least on a number of points in that voxel. In some embodiments, the occupancy probability is determined based on a variance of the positioning data associated with the one or more points located in the voxel. In some embodiments, for each voxel having an occupancy probability greater than an occupancy probability threshold value, an average position of the one or more points in the voxel can be calculated, and a point can be generated in the map at the average position. In some embodiments, for each voxel having an occupancy probability greater than the occupancy probability threshold value, an average intensity value of the one or more points in the voxel can be calculated, and the average intensity value can be associated with the generated point in the map. In an embodiment, the average intensity value is calculated based on feature of each point in the voxel, where the feature of each point is associated with an elevation or a material detected by the scanning sensor.

In some embodiments, the method may further include determining a distribution of points in the mapping data, each of the points in the mapping data associated with a distance from a nearest neighboring point in the mapping data, and removing any points associated with a distance greater than a distance threshold value. In some embodiments, the method may further include downsampling the mapping data by a scaling factor, dividing the mapping data into a plurality of voxels, and outputting an average point from the downs ampled mapping data for each of the plurality of voxels. In some embodiments, the method may further include transforming the map into a second coordinate system and outputting the transformed map. For example, the positioning data may be converted from the scanner reference frame to a north-east-down (NED) reference frame (or a NED coordinate system). The reference frame to which the positioning data is converted may vary depending on the application of the map that is being produced. For example, if the map is being used in surveying, it may be converted to the NED reference frame. For another example, if the map is being used for rendering motions such as flight simulation, it may be converted to the FlightGear coordinate system. Other applications of the map may effect conversions of the positioning data to different reference frames or different coordinate systems.

In some embodiments, geo-referencing as described above may be combined with scan matching, such as Simultaneous Localization and Mapping (SLAM) or LiDAR Odometry and Mapping (LOAM). Traditional methods make use of SLAM with or without inertial navigation input. For example, some methods inject IMU information with SLAM and sometimes inject odometry via GPS which provides an improved mapping algorithm. Unlike traditional methods, embodiments can perform direct geo-referencing as discussed above, and then a layer of SLAM or LOAM can be added on top of the geo-references. This provides a robust mapping algorithm as the geo-references serves as a floor on the quality of the resulting map.

In some embodiments, geo-referencing as described above may be combined with normal distribution transformation (NDT). NDT is a LiDAR scan registration method which is in between a feature-based registration method (such as LOAM) and a point-based registration method (such as iterative closest point). The "features" of the world are described by multivariate Gaussian distributions defined in each voxel. A probability density function (PDF) is generated for each cell and points are matched to the map by maximizing the sum of probability generated by the PDF, points x, and a transformation T:

$$T = \underset{T}{\operatorname{argmin}} \sum_{i=1}^{k} -p_i(Tx_i)$$

$$p_i(x_i) \sim N\left(\bar{\mu}_i, \sum_i\right)$$

$$\bar{\mu}_i = \begin{bmatrix} \mu_x \\ \mu_y \\ \mu_z \end{bmatrix}$$

Figure 11:
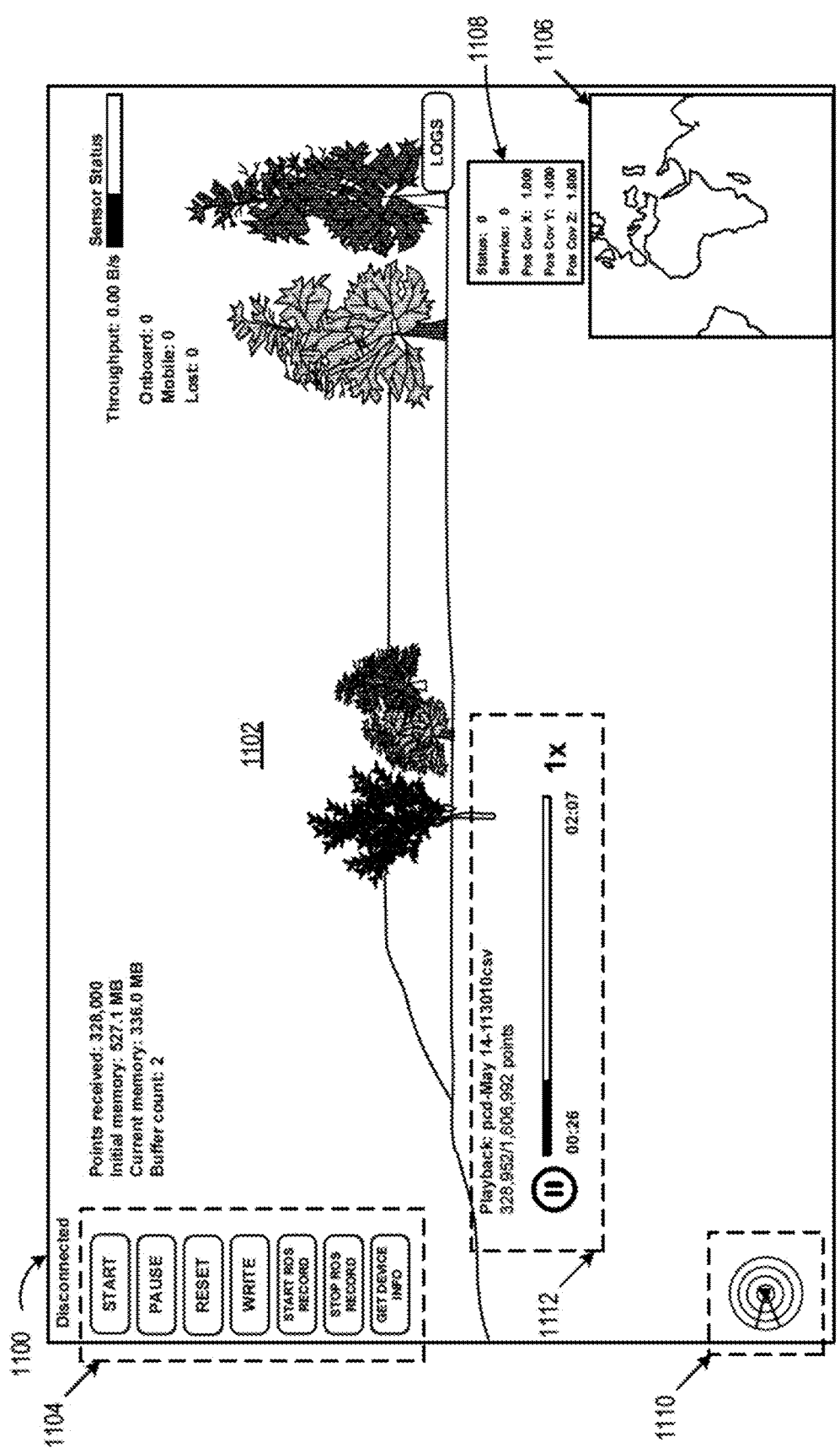
FIG. 11 shows a graphical user interface (GUI) for real-time mapping in a movable object environment, in accordance with various embodiments.

FIG. 11 shows a graphical user interface (GUI) 1100 for real-time mapping in a movable object environment, in accordance with various embodiments. The user interface (UI) 1100 may be rendered on a display (e.g., a touchscreen, a light-emitting diode (LED) display, an organic light-emitting diode (OLED) display, a monitor, etc.) of a client device, such as a smartphone, tablet, laptop, desktop, or other computing device. In some embodiments, the client device may be client device 110 discussed above. Additionally, or alternatively, the user interface 1100 may be rendered on a display of a different client device in communication with the movable object.

In some embodiments, user interface 1100 may be divided into multiple sub-parts for rendering digital objects in different areas of the display. These sub-parts may include separate frames, panels, or other elements that divide where information and/or functional elements are displayed in the user interface 1100. For example, the UI may include a main portion 1102 in which a real-time local map (e.g., generated by associating mapping data and positioning data using time data) is rendered. In the example shown in FIG. 11, an area may be scanned by a movable object using a LiDAR sensor. As discussed above, mapping data, such as point cloud data, collected by the LiDAR sensor may be georeferenced based on positioning data obtained from a positioning sensor carried by the movable object. The resulting mapping data may then be downsampled such that it can be rendered on the display of the mobile device in real-time, as the mapping data is collected. The downsampled mapping data, when rendered, shows a real-time local map which includes a representation of the area that has been scanned and objects located therein, such as the trees shown in the example of FIG. 11. In some embodiments, the client application provides intuitive gesture controls so the user can rotate, zoom, and pan over the rendering of the point cloud data via the user interface. For example, the client device may include a touchscreen interface, which enables the user to interact with the real-time map and other user interface elements.

In various embodiments, other sub-parts may be overlaid on the main portion 1102. For example, a first sub-part of the UI may include one or more selectable commands 1104, while a second sub-part 1106 may include a global map showing the position of the movable object in a global positioning system and another sub-part 1108 may show current information about the movable object, such as its status, any service codes, and its current position in X, Y, Z coordinates. Another sub-part 1110 may include a representation of a FOV or an orientation of the LiDAR sensor, while other sub-parts may include a taskbar showing status of each component (battery level, internet connection, etc.) of the movable object, etc. In some embodiments, the various sub-parts may be rendered separately such that no sub-part is overlaid on any other sub-part.

In various embodiments, a user can view and/or control the collection of mapping data using the user interface 1100. For example, the UI 1100 can include selectable commands 1104 that allow the user to send commands to control the movable object. As shown in FIG. 11, these selectable commands 1104 may include: Start/Pause/Reset mapping, write mapping results into a LiDAR data exchange (LAS) file, allow the user to set a name for the LAS file, Start/Stop recording of a file (e.g., such as a robot operating system (ROS) bag file) for replaying data collection later, or obtain device information regarding different components of the movable object. Additionally, the UI 1100 may include playback controls, as shown in sub-part 1112, which may enable the user to pause or speed up the playback of previously recorded mapping data, such as a local file or a file stored remotely that is accessible to the application over a communication network. The playback controls can include controls for playback speed. For example, the user can play the mapping data at 1× speed, or at various other speeds such as 0.5×, 2×, etc.

Figure 12:
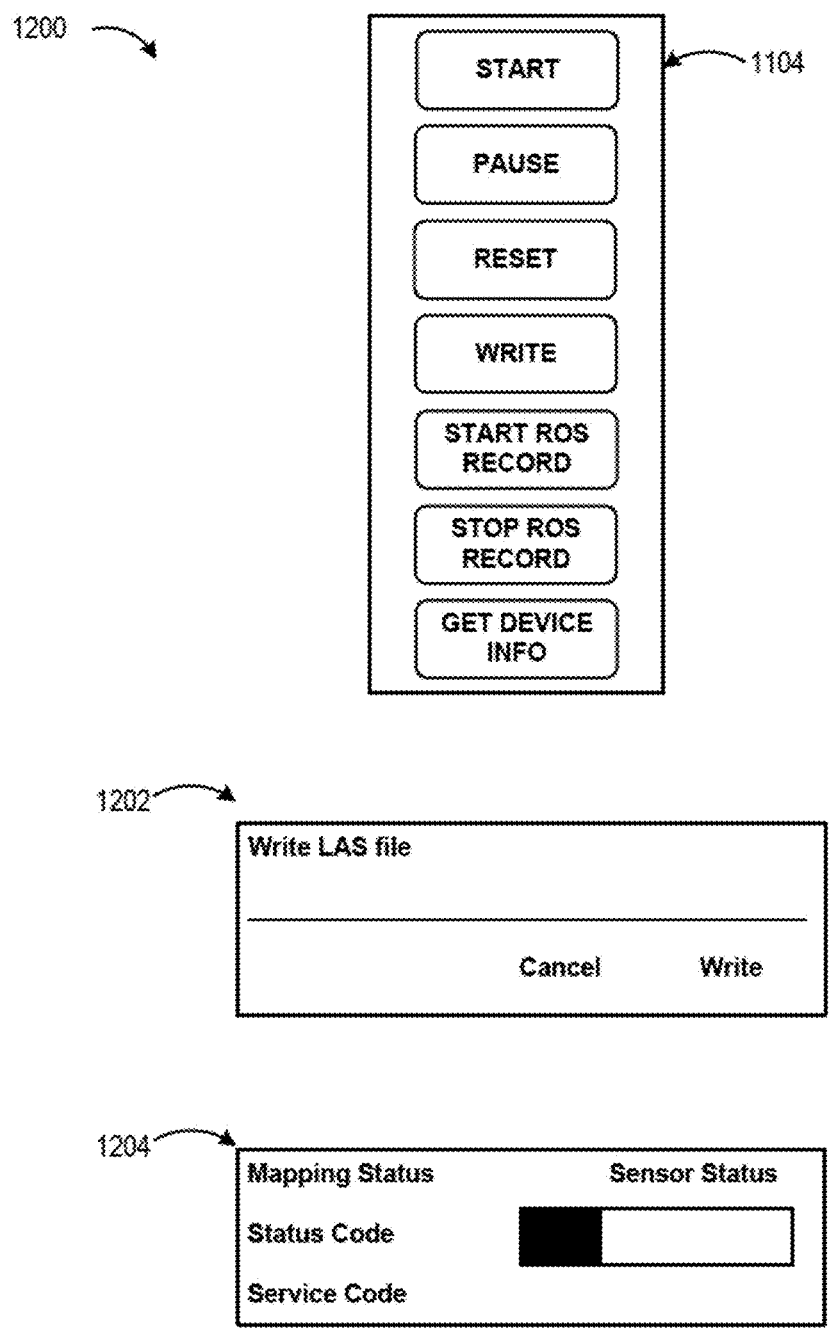
FIG. 12 shows example GUI widgets for real-time mapping in a movable object environment, in accordance with various embodiments.

FIG. 12 shows additional user interface elements 1200 in accordance with an embodiment. In addition to the selectable commands 1104, the user interface can enable the user to select storage where to write LAS file, as shown at 1202, and may provide a mapping status 1204. The mapping status 1204 may provide a status window of the scanning sensor, positioning sensor, onboard computer, and/or other components of the movable object to indicate if the movable object is ready to perform a mapping mission. The background color of the status window may change in color, such as change from red to yellow to green, where green indicates that the user can start mapping. Tapping on the status window provides a more detailed message of the mapping status. In some embodiments, the user interface elements 1200 may be rendered as pop-up windows shown on a display of the client device. One or more of the user interface elements 1200 may pop-up automatically (e.g., when a stop mapping command is detected, a window 1202 may pop-up enabling the user to select where to write and store the LAS file or name the LAS file) or manually (e.g., when the user clicks on the write button in the selectable commands 1104 the window 1202 may then pop-up). Similarly, the mapping status element 1204 may pop-up automatically and may be dismissed automatically once the movable object is ready to perform a mapping mission, or may pop-up in response to a user selecting the start button from selectable commands 1104 before the movable object is ready to perform a mapping mission.

Figure 13:
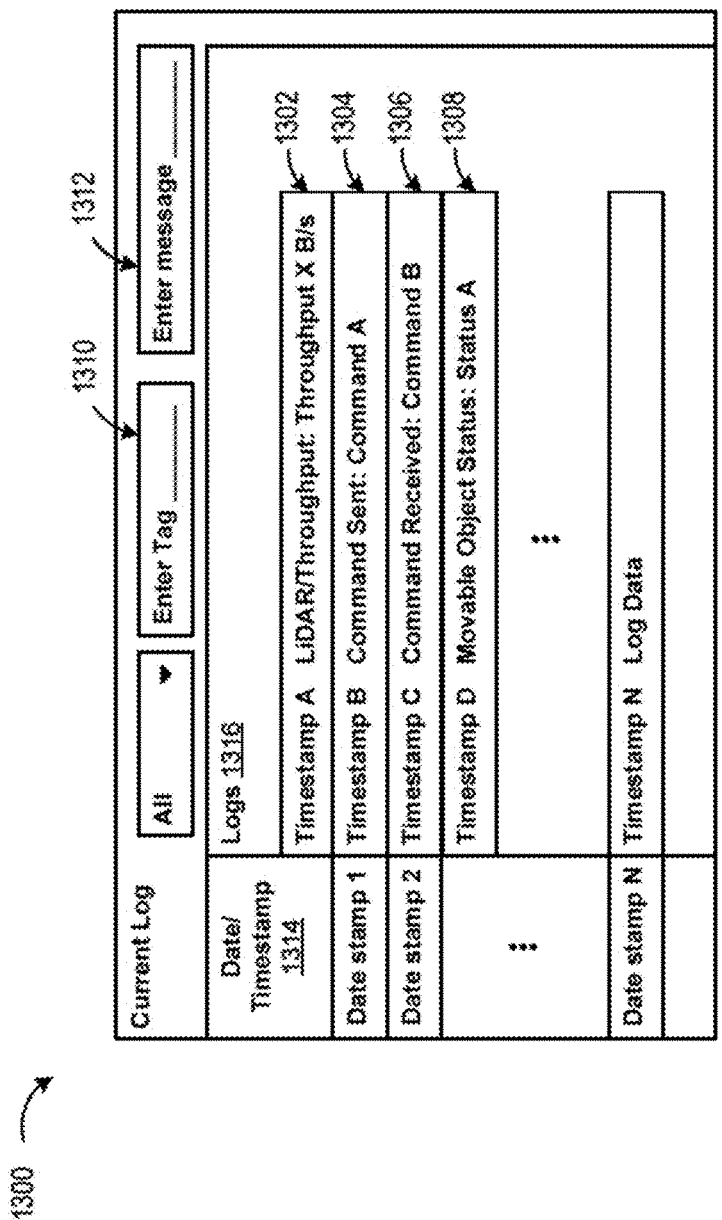
FIG. 13 shows an example of movable object logs shown in the GUI for real-time mapping in a movable object environment, in accordance with various embodiments.

FIG. 13 shows an example of movable object logs shown in the GUI for real-time mapping in a movable object environment, in accordance with various embodiments. As shown in FIG. 13, logs 1300 may be displayed to the user via the user interface 1100. The logs 1300 may be displayed in a pop-up window, in a particular sub-part of the UI 1100 as a UI element, or otherwise presented to the user through the user interface. The logs 1300 may record an entry whenever a user accesses the application via the user interface 1100. In some embodiments, the logs 1300 may also include details about the movable object or components thereof prior to, during, and/or after a mapping mission has been performed. For example, the logs 1300 may present sensor performance at a particular time, as shown at 1302 (e.g., throughput of the LiDAR sensor), commands that have been sent 1304 and received 1306, along with timestamps associated with the sending and receiving of those commands, device status 1308, and/or other information associated with the movable object, the user's interaction with the UI 1100, such as a size of the generated mapping data, etc. In some embodiments, logs can be filtered or sorted in order by date, timestamp, type, tag, or message. In some embodiments, the user may search for logs by tag identifier 1310 and/or message 1312. At least when sorted by date or timestamp, as shown in FIG. 13, the user may be able to select a date or timestamp 1314 and then view logs 1316 associated with that date or timestamp. In some embodiments, logs can be downloaded and shared with other apps.

Figure 14:
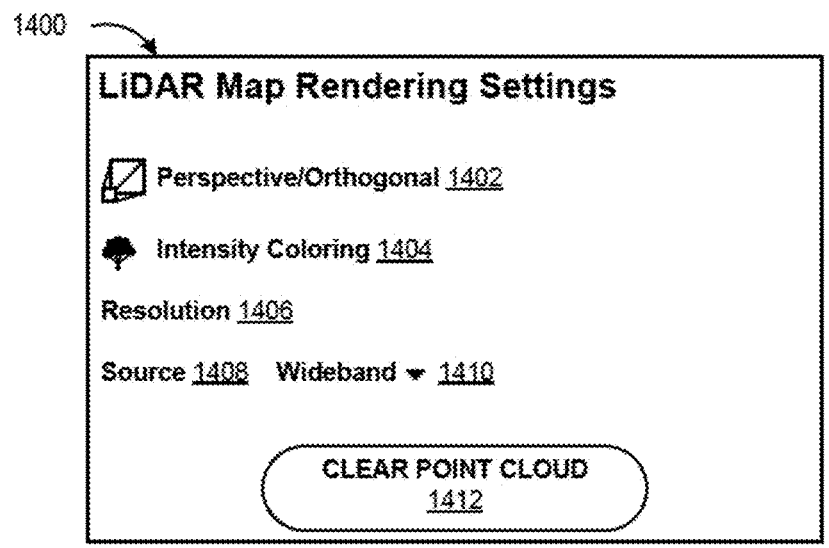
FIG. 14 shows an example of LiDAR map rendering settings for the GUI for real-time mapping in a movable object environment, in accordance with various embodiments.

FIG. 14 shows an example of LiDAR map rendering settings 1400 for the GUI for real-time mapping in a movable object environment, in accordance with various embodiments. As discussed above, the client application can render mapping data collected by the movable object through user interface 1100. As shown in FIG. 14, LiDAR Map Rendering Settings 1400 can be modified by the user. The rendering settings can be used to control how the mapping data is viewed. For example, the user may select whether to view the mapping data via a perspective or orthogonal view 1402. In some embodiments, the rendering settings may also include intensity coloring settings 1404. As discussed, mapping data may include intensity values that can be used when rendering the mapping data to provide a visual difference between points in the mapping data based on their intensity values. These intensity values may be used to represent different characteristics of the objects and/or area being scanned by the LiDAR sensor. For example, as discussed above with respect to FIG. 6, the intensity values may represent elevation above a reference plane. In various embodiments, intensity may be represented using different colors to represent different values or ranges of values. Additionally, intensity may be used to represent different materials being scanned. For example, steel and concrete will absorb and reflect the incident radiation produced by the scanning sensor differently, enabling the scanning sensor to identify different materials in use. Each material may be encoded as a different intensity value associated with each point and represented by a different color in the output map.

In some embodiments, the user may also control the resolution 1406 of the mapping data. The resolution may be determined by the user, or by the mapping manager based on, e.g., available computing resources, user preferences, default values, or other application-specific information. For example, a lower resolution (e.g., larger voxel size) may be used to produce a sparse downsampled point cloud for visualization on a client device or a mobile device. In some embodiments, the user may specify a particular resolution by voxel size through the map rendering settings 1400 and/or may choose to increase or decrease the resolution in increments. Such relative controls enable a user to change the resolution intuitively, without requiring the user to know how large or small to make the voxels in order to obtain their desired resolution. In some embodiments, the mapping manager may cause the mapping data to be rendered at a default resolution and the user may choose to increase or decrease relative to the default resolution.

In some embodiments, the map rendering settings 1400 may also enable the user to specify a source 1408 of the point cloud data. For example, the map rendering settings 1400 may include a drop down menu 1410 that enables the user to select from a variety of sources, such as wideband processing of point cloud data received from the movable object in real time, or ROS processing of point cloud data sent from a server or other data storage (e.g., used for debugging), etc. In some embodiments, the user can specify a location of a file to be loaded, such as a file from the client device or from a server or other computing device in communication with the client application (e.g., over one or more networks). In some embodiments, the map rendering settings 1400 may also include a selectable command 1412 to clear the currently rendered point cloud data. For example, prior to loading new mapping data, the current mapping data may be cleared by selecting command 1412.

Figure 15:
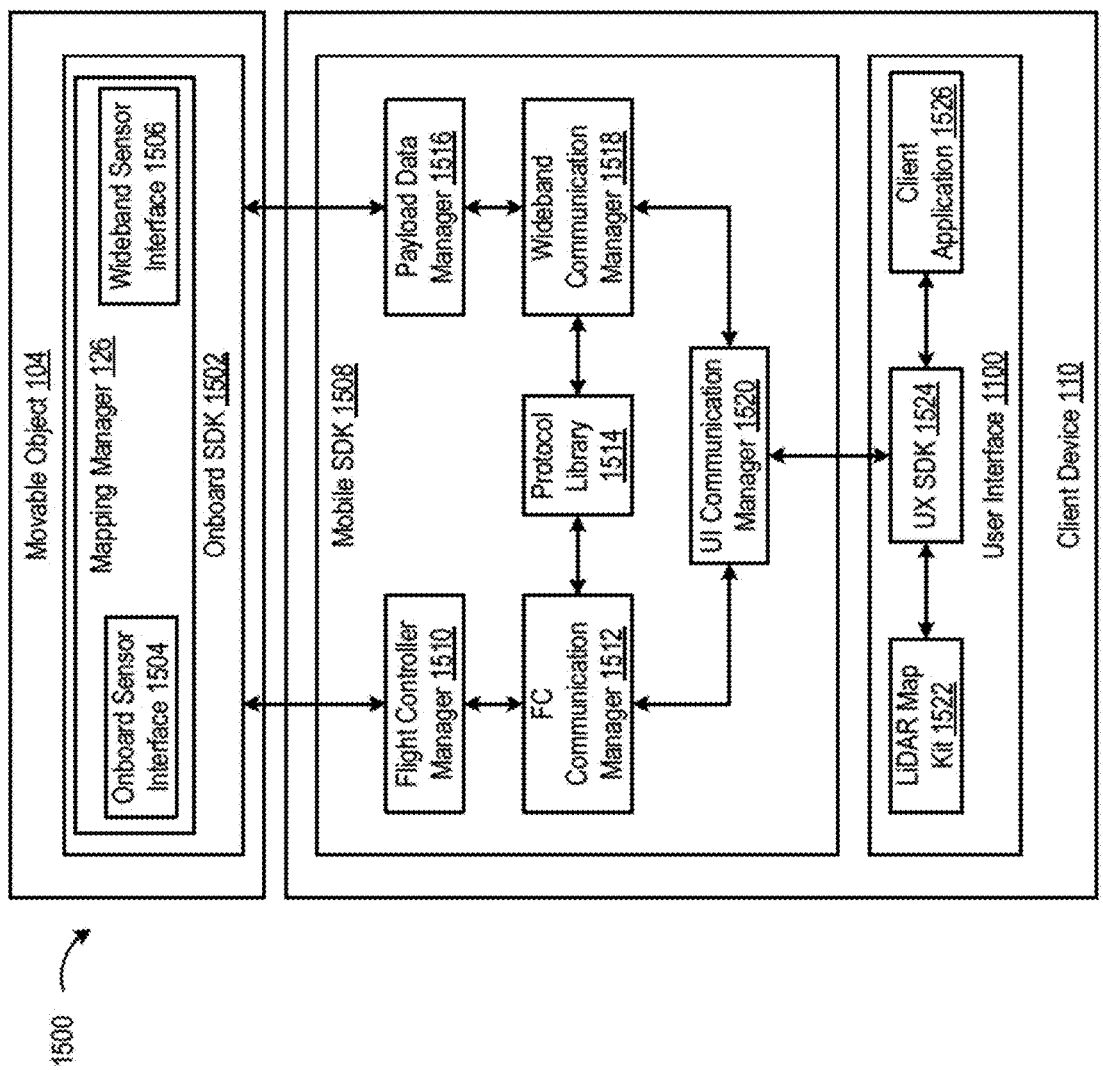
FIG. 15 shows an example communication pipeline between a movable object and a client application, in accordance with an embodiment.

FIG. 15 shows an example 1500 pipeline of communication between the movable object 104 and the application on client device 110. In some embodiments, as discussed, the movable object 104 can include an onboard computer which implements an onboard SDK 1502. As discussed, the mapping manager 126 may be implemented by the onboard SDK 1502 and may include sensor interfaces, such as onboard sensor interface 1504 and wideband sensor interface 1506. Onboard sensor interface 1504 may be used to obtain sensor data and/or send commands to various sensors on movable object 104, such as functional modules 108 which communicate via flight controller 114 and/or positioning sensor 202. Wideband sensor interface 1506 may be used to obtain sensor data and/or send commands to various high bandwidth sensors, such as a LiDAR sensor or other scanning sensor 124. Other sensors which provide information to, or receive information from, client application 1526 may include a command sensor to send and receive specific commands (e.g., based on user input through selectable commands 1104); a status sensor which can receive the current status, service and position covariance of the GNSS IMU sensor (e.g., which may provide the status data as shown in the status widget shown at 1204 in FIG. 12); a LiDAR Map Sensor which receives point cloud data and is used by the LiDAR map kit to render the point cloud data; a node status sensor which receives the status of different services running on the onboard device (e.g., which may be used to generate logs, as shown in FIG. 13).

In some embodiments, the client device 110 may include a mobile SDK 1508, which can communicate with the onboard SDK 1502, and user interface 1100. The mobile SDK 1508 may include a flight controller manager 1510 which can communicate commands/data to, and data from, the flight controller via the onboard SDK 1502. For example, telemetry data may be received from the flight controller, and commands to change the course of the movable object may be sent to the flight controller by flight controller manager 1510. In some embodiments, a flight controller communication manager 1512 can convert commands received from the user into a machine-readable format that is understandable by the flight controller. This may include using a protocol library 1514 to encode the commands in a format that is transmittable to, and understandable by, the flight controller. In some embodiments, the FC communication manager 1512 and protocol library 1514 can similarly be used to decode data received from the flight controller to be rendered to the user via user interface 1100. Similarly, a payload data manager 1516 may receive sensor data obtained by one or more high bandwidth sensors, such as a scanning sensor, stereoscopic camera, or other high bandwidth sensor, via wideband sensor interface 1506. In some embodiments, the payload data manager 1516 can also send commands to one or more wideband sensors via wideband sensor interface 1506. For example, the angle at which the LiDAR sensor is positioned may be adjustable in response to a command from the user. The command can be packaged to be sent to the payload, such as a LiDAR sensor, by wideband communication manager 1518, using protocol library 1514, and then sent to the payload by payload data manager 1516 via wideband sensor interface 1506.

When data is received from the sensors of the movable object, this data can be received by UI communication manager 1520 and provided to a UX SDK 1524 of user interface 1100. The UX SDK 1524 can manage how various UI elements are rendered in response to the sensor data obtained from the UI communication manager 1520. For example, the rendering of a battery icon may vary depending on the current battery level obtained from the UI communication manager as well as the type of data received from the battery sensor (e.g., the number of battery cells in the batter in use by the movable object, etc.). Additionally, the UX SDK 1524 can manage to request sensor data from various components of the movable object periodically or in response to a specific request for sensor data received from the user via user interface 1100. The UX SDK 1524 can also convert command instructions received from the user through the user interface into commands and/or requests to be sent to the movable object. The commands and/or requests can be sent by the UX SDK to the UI communication manager 1520. The UI communication manager 1520 can identify the sensor or component of the movable object to which the command or request is being sent and route the command or request via the FC communication manager 1512 or wideband communication manager 1518. Responses to the commands (or other data generated in response to the commands) can be similarly routed back to the user interface via the FC communication manager 1512 or wideband communication manager 1518 and the UI communication manager 1520. In some embodiments, the UX SDK 1524 can use LiDAR map kit 1522 to render point cloud data received from a LiDAR sensor. In some embodiments, the LiDAR map kit 1522 can implement a rendering framework and/or one or more libraries for rendering point cloud data in a graphical user interface on behalf of the client application.

Figure 16:
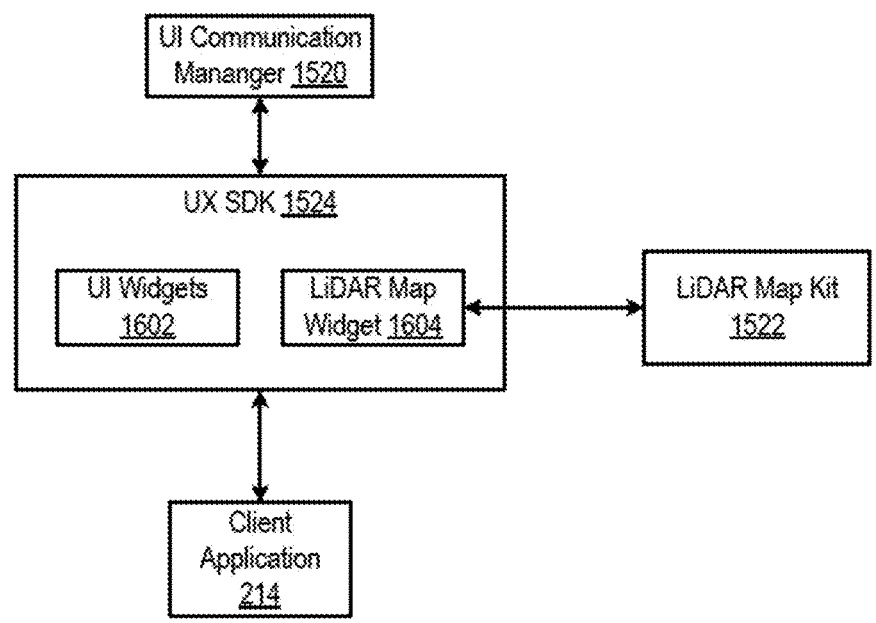
FIG. 16 shows an example UI architecture, in accordance with an embodiment

FIG. 16 shows an example UI architecture 1600, in accordance with an embodiment. The UI architecture 1600 can include a UI communication manager 1520. As discussed above, the UI communication manager enables the application to communicate with (e.g., receive sensor data from and/or provide commands to) the onboard and wideband sensors of the movable object. The UI architecture may also include a UX SDK 1524 that includes various UI widgets 1602. As discussed, the user interface may provide a variety of user interface elements, including selectable commands 1104, a status widget 1204, mapping widgets 1106, 1108, 1110, a task bar and its associated widgets (e.g., related to battery level, communication strength, etc.), log interface 1300, map rendering settings widget 1400, etc. The rendering of each of these widgets may be managed by UX SDK 1524. Additionally, a Lidar Map Widget 1604 provides access to the LiDAR map kit 1522 which handles point cloud rendering in the user interface of the application.

Figure 17:
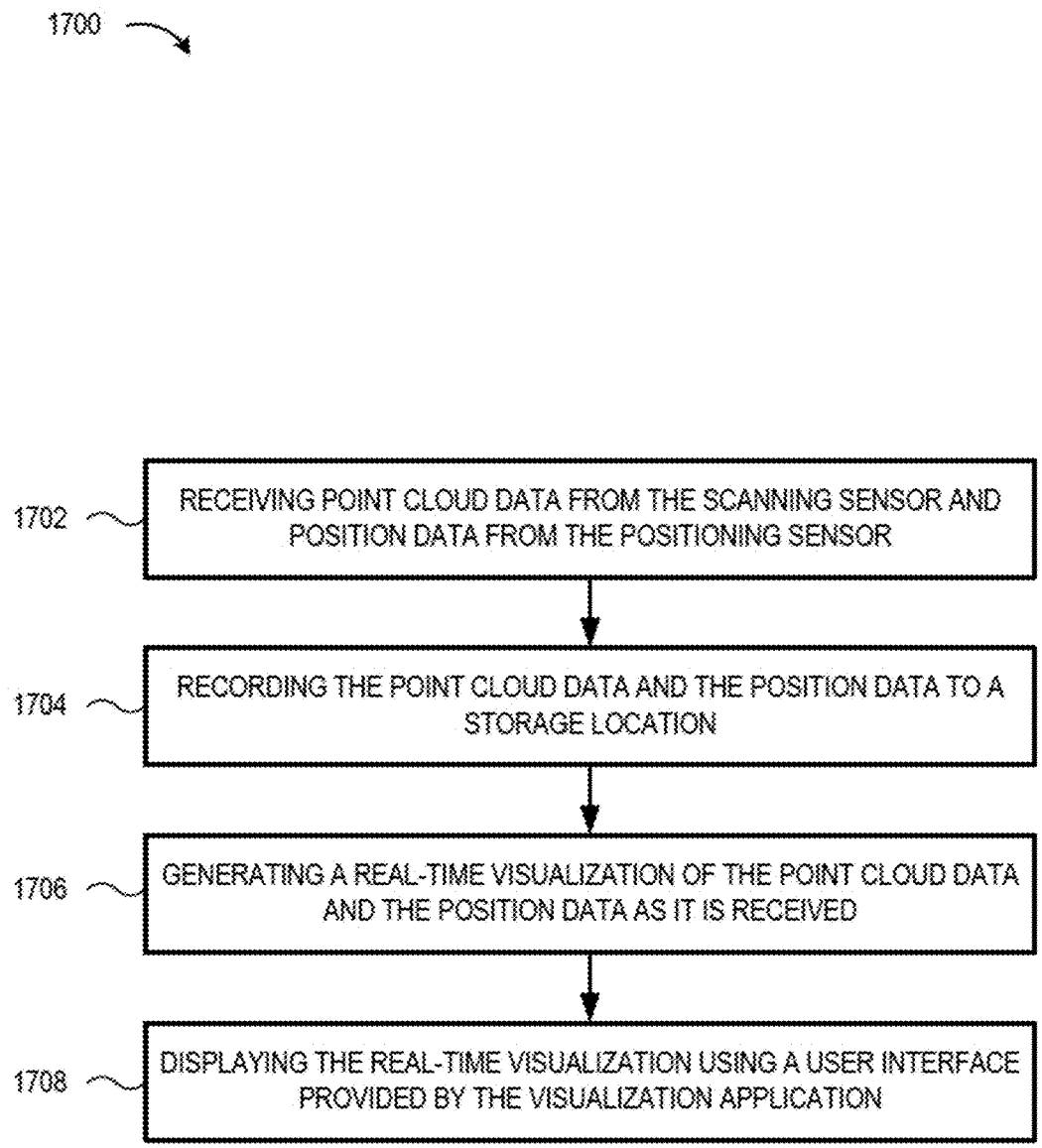
FIG. 17 shows a flowchart of a method for real-time mapping in a movable object environment, in accordance with various embodiments.

FIG. 17 shows a flowchart of a method for real-time mapping in a movable object environment, in accordance with various embodiments. At operation/step 1702, mapping data such as point cloud data is received from a scanning sensor and position data is received from a positioning sensor. At operation/step 1704, the point cloud data and the position data are recorded to a storage location.

At operation/step 1706, a real-time visualization of the point cloud data and the position data is generated as it is received. In some embodiments, generating the real-time visualization may further include generating the real-time visualization of the point cloud data based on an intensity value associated with each point in the point cloud data. The intensity value represents a material composition or height above a reference plane associated with each point in the point cloud data. At operation/step 1708, the real-time visualization is displayed using a user interface provided by a visualization application.

In some embodiments, the method may further include receiving a selection of a mapping file, the mapping file including previously collected sensor data, the sensor data including historical point cloud data and historical position data, receiving a request to view playback of the mapping file, and displaying a historical visualization generated based on the mapping file using the user interface.

In some embodiments, the method may further include receiving a request to change a resolution of the point cloud data, changing a voxel size based at least on the request to generate a second point cloud data having a different resolution than the point cloud data, and generating the real-time visualization of the second point cloud data. In some embodiments, the resolution of the point cloud data is automatically set to a default resolution determined based at least on computing resources associated with a client device.

In some embodiments, the method may further include obtaining sensor data from one or more sensors of a movable object, generating a representation of the sensor data using at least one associated graphical user interface element, and displaying the representation of the sensor data as an overlay on the real-time visualization.

Many features can be performed in, using, or with the assistance of hardware, software, firmware, or combinations thereof. Consequently, features may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features can be incorporated in software and/or firmware for controlling the hardware of a processing system, and for enabling a processing system to interact with other mechanism utilizing the results. Such software or firmware may include, but is not limited to, application code, device drivers, operating systems and execution environments/containers.

Features of the invention may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description has been provided for the purposes of illustration and description. It is not intended to be exhaustive or to limit the invention to the precise forms disclosed. The breadth and scope should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

What is claimed is:

1. A system for real-time mapping in a movable object environment, comprising:
    at least one movable object, including a computing device;
    a scanning sensor electronically coupled to the computing device;
    a positioning sensor electronically coupled to the computing device;

a client device in communication with the at least one movable object, the client device including at least one processor and a visualization application, the visualization application including instructions which, when executed by the processor, cause the visualization application to:

receive point cloud data from the scanning sensor and position data from the positioning sensor;

record the point cloud data and the position data to a storage location;

generate a real-time visualization of the point cloud data and the position data as it is received;

display the real-time visualization using a user interface provided by the visualization application;

receive a request to generate a second point cloud data having a different resolution than the point cloud data;

change a voxel size based at least on the request to generate the second point cloud data for changing a resolution of the point cloud data; and generate the real-time visualization of the second point cloud data.

2. The system of claim 1, wherein the instructions, when executed by the processor, further cause the visualization application to:

receive a selection of a mapping file, the mapping file including previously collected sensor data, the sensor data including historical point cloud data and historical position data;

receive a request to view playback of the mapping file; and display a historical visualization generated based on the mapping file using the user interface.

3. The system of claim 1, wherein the resolution of the point cloud data is automatically set to a default resolution determined based at least on computing resources associated with the client device.

4. The system of claim 1, wherein the instructions to generate the real-time visualization of the point cloud data and the position data as it is received, when executed by the processor, further cause the visualization application to:

generate the real-time visualization of the point cloud data based on an intensity value associated with each point in the point cloud data.

5. The system of claim 4, wherein the intensity value represents a material composition or height above a reference plane associated with each point in the point cloud data.

6. The system of claim 1, wherein the instructions, when executed by the processor, further cause the visualization application to:

obtain sensor data from one or more sensors of the movable object;

generate a representation of the sensor data using at least one associated graphical user interface element; and display the representation of the sensor data as an overlay on the real-time visualization.

7. A method for real-time mapping in a movable object environment, comprising:

receiving point cloud data from a scanning sensor and position data from a positioning sensor;

recording the point cloud data and the position data to a storage location;

generating a real-time visualization of the point cloud data and the position data as it is received;

displaying the real-time visualization using a user interface provided by a visualization application;

receiving a request to generate a second point cloud data having a different resolution than the point cloud data;

changing a voxel size based at least on the request to generate the second point cloud data for changing a resolution of the point cloud data; and generating the real-time visualization of the second point cloud data.

8. The method of claim 7, further comprising:

receiving a selection of a mapping file, the mapping file including previously collected sensor data, the sensor data including historical point cloud data and historical position data;

receiving a request to view playback of the mapping file; and displaying a historical visualization generated based on the mapping file using the user interface.

9. The method of claim 7, wherein the resolution of the point cloud data is automatically set to a default resolution determined based at least on computing resources associated with a client device.

10. The method of claim 7, wherein generating the real-time visualization of the point cloud data and the position data as it is received, further comprises:

generating the real-time visualization of the point cloud data based on an intensity value associated with each point in the point cloud data.

11. The method of claim 10, wherein the intensity value represents a material composition or height above a reference plane associated with each point in the point cloud data.

12. The method of claim 7, further comprising:

obtaining sensor data from one or more sensors of a movable object;

generating a representation of the sensor data using at least one associated graphical user interface element; and displaying the representation of the sensor data as an overlay on the real-time visualization.

13. A non-transitory computer readable storage medium including instructions stored thereon which, when executed by at least one processor, cause the at least one processor to perform the steps of:

receiving point cloud data from the scanning sensor and position data from the positioning sensor;

recording the point cloud data and the position data to a storage location;

generating a real-time visualization of the point cloud data and the position data as it is received;

displaying the real-time visualization using a user interface provided by the visualization application;

receiving a request to generate a second point cloud data having a different resolution than the point cloud data;

changing a voxel size based at least on the request to generate the second point cloud data for changing a resolution of the point cloud data; and generating the real-time visualization of the second point cloud data.

14. The non-transitory computer readable storage medium of claim 13, wherein the instructions, when executed, further cause the at least one processor to perform the steps of:

receiving a selection of a mapping file, the mapping file including previously collected sensor data, the sensor data including historical point cloud data and historical position data;

receiving a request to view playback of the mapping file; and displaying a historical visualization generated based on the mapping file using the user interface.

15. The non-transitory computer readable storage medium of claim 13, wherein the resolution of the point cloud data is automatically set to a default resolution determined based at least on computing resources associated with a client device.

16. The non-transitory computer readable storage medium of claim 13, wherein the step of generating the real-time visualization of the point cloud data and the position data as it is received, when executed, further causes the at least one processor to perform the step of:
generating the real-time visualization of the point cloud data based on an intensity value associated with each point in the point cloud data, wherein the intensity value represents a material composition or height above a reference plane associated with each point in the point cloud data.

17. The non-transitory computer readable storage medium of claim 13, wherein the instructions, when executed, further cause the at least one processor to perform the steps of:
obtaining sensor data from one or more sensors of a movable object;
generating a representation of the sensor data using at least one associated graphical user interface element; and
displaying the representation of the sensor data as an overlay on the real-time visualization.

* * * * *